US008520944B2

(12) United States Patent
Cimbalista, Jr.

(10) Patent No.: US 8,520,944 B2
(45) Date of Patent: Aug. 27, 2013

(54) METHOD FOR IMPROVING VISUALIZATION OF INFRARED IMAGES

(76) Inventor: Mario Cimbalista, Jr., Curitiba (BR)

( * ) Notice: Subject to any disclaimer, the term of this patent is extended or adjusted under 35 U.S.C. 154(b) by 332 days.

(21) Appl. No.: 12/926,655

(22) Filed: Dec. 2, 2010

(65) Prior Publication Data

US 2011/0091102 A1    Apr. 21, 2011

Related U.S. Application Data

(63) Continuation-in-part of application No. 11/722,711, filed as application No. PCT/BR2005/000201 on Sep. 22, 2005, now abandoned.

(30) Foreign Application Priority Data

Dec. 24, 2004 (BR) .................................. 8403235 U

(51) Int. Cl.
*G06K 9/00* (2006.01)
(52) U.S. Cl.
USPC ........................................................ 382/167

(58) Field of Classification Search
None
See application file for complete search history.

(56) References Cited

FOREIGN PATENT DOCUMENTS

| | | |
|---|---|---|
| CN | 1404796 A | 3/2003 |
| DE | 103 59 192 A1 | 7/2005 |
| JP | 10-148580 A | 6/1998 |
| SU | 1800655 A1 | 3/1993 |

*Primary Examiner* — Nirav G Patel
(74) *Attorney, Agent, or Firm* — Matthias Scholl, PC; Matthias Scholl

(57) ABSTRACT

A coding process applicable to an original infrared image, generated from any value matrix, to change the infrared image into negative or inverted black and white and grey with the addition of specific split colors, causing a substantial difference in the way the retina and the brain processes the resultant images. The result obtained is a much less exhaustive way to see, identify and interpret infrared images generated by any infrared camera that uses this conversion process.

3 Claims, 17 Drawing Sheets
(15 of 17 Drawing Sheet(s) Filed in Color)

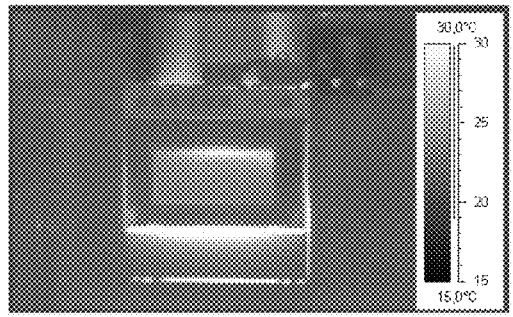
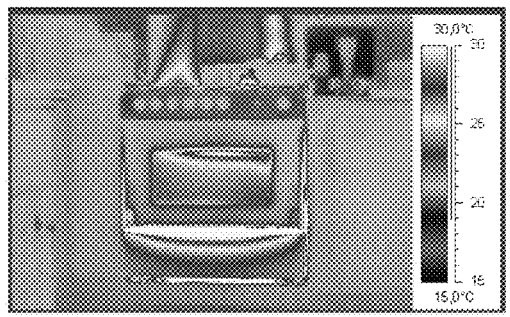
FIG. 16a　　　　　　　　FIG. 16b
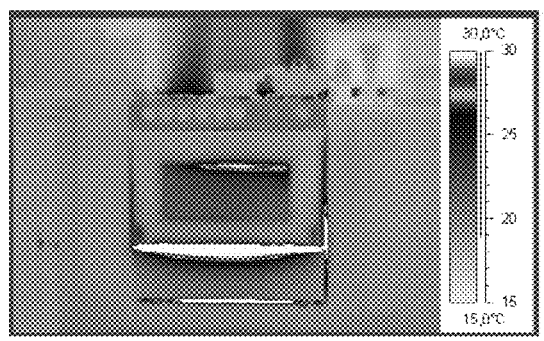
FIG. 17
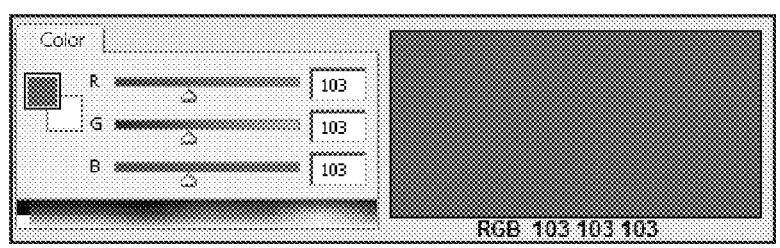
FIG. 18

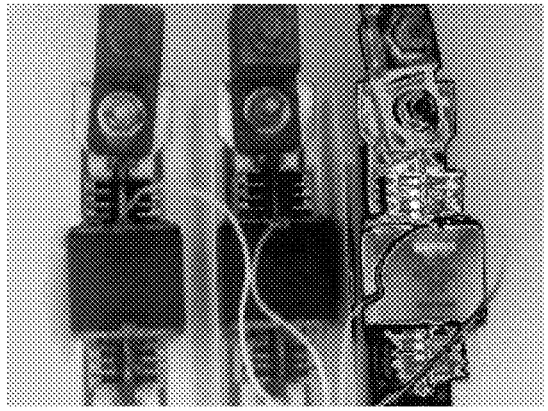 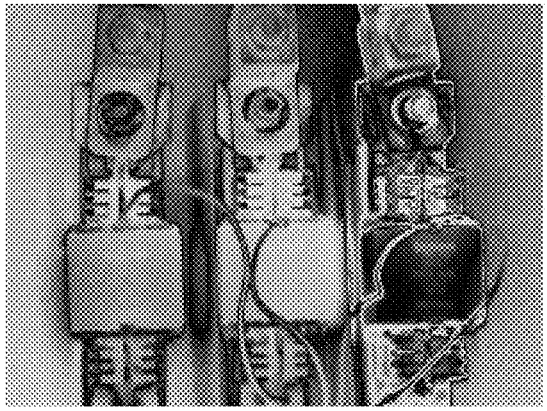
FIG. 28a          FIG. 28b
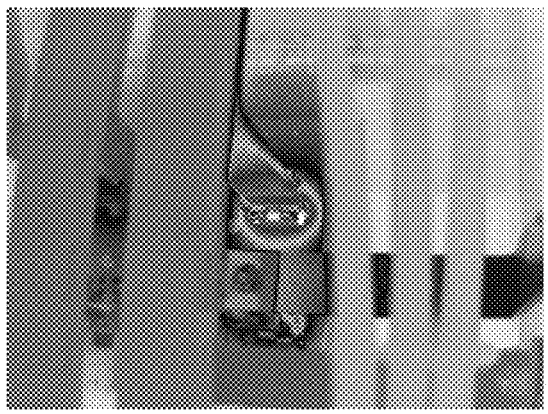 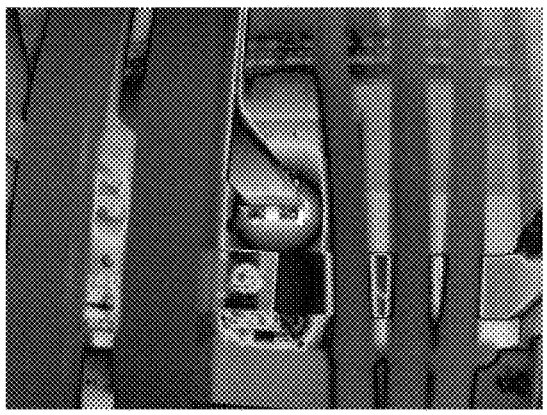
FIG. 28c          FIG. 28d

METHOD FOR IMPROVING VISUALIZATION OF INFRARED IMAGES

CROSS-REFERENCE TO RELATED APPLICATIONS

This application is a continuation-in-part of U.S. Ser. No. 11/722,711 with a 371(c) date of Jun. 23, 2007, now pending, which is a National Phase entry Application of International Patent. Application No. PCT/BR2005/000201 with an international filing date of Sep. 22, 2005, designating the United States, and further claims priority benefits to Brazilian Patent Application No. MU 8403235-9, filed Dec. 24, 2004. The contents of all of these specifications, including any intervening amendments thereto, are incorporated herein by reference.

INCORPORATION BY REFERENCE OF MATERIAL SUBMITTED ON A COMPACT DISC

Tables 8 and 9 are provided on one compact disc. The compact disc contains two files named "Table 8.txt" and "Table 9.txt" The files were created on Nov. 13, 2010, and their size is 387,299 bytes and 387,046 bytes, respectively. The contents of the compact disc are hereby incorporated by reference in its entirety.

LENGTHY TABLES

The patent contains a lengthy table section. A copy of the table is available in electronic form from the USPTO web site (http://seqdata.uspto.gov/?pageRequest=docDetail&DocID=US08520944B2). An electronic copy of the table will also be available from the USPTO upon request and payment of the fee set forth in 37 CFR 1.19(b)(3).

BACKGROUND OF THE INVENTION

1. Field of the Invention

The invention relates to a coding process for original infrared images, wherein the images are converted to negative black and white and wherein specific split colors are added causing a substantial difference in the way the retina and brain process the resultant images. The process allows for improved discrimination and interpretation of thermal content of infrared images and for easier understanding and perceiving of information contained in infrared images. Reading of infrared images coded using the process is much less tiring to the operator of thermal cameras and related software relative to original infrared images.

2. Description of the Related Art

Infrared thermography has been in development for over 50 years and significant advances have been made in the area of sensors, cooling, portability, weight, and ergonomics of infrared apparatus. The main purpose of these developments was to construct infrared apparatus that is more suitable and ergonomic for portable use and applicable to a wider array of applications. However, while much progress has been made in the realm of infrared hardware, visualization of thermal infrared images has largely been left behind and interpreting infrared images still presents a challenge.

Images produced by infrared thermographic equipments are alien to the human brain and cognitive process since our eyes perceives only the visible light range out of the entire electromagnetic spectrum. Chemical processes inside the human eye and functional cells distributions as well as cognitive-perceptual impact of images are a crucial part in the perception, detection, understanding and recording of infrared images. This invention alleviates the challenge of interpreting infrared images by processing raw infrared images so as to make them much more suitable for the human eye and mind.

In general, unprocessed infrared images are produced by infrared cameras, shown in FIG. 1, and described, e.g., in U.S. Pat. Nos. 5,420,419, 6,144,031, and D 483,782, which are designed to detect infrared radiation emitted by any object and transform these information into human-eye-recognizable images, making them possible to be interpreted in any specific situation.

Being so, all images produced by infrared cameras, digital or analog, are detected by an electronic sensor made from tiny cells called pixels, varying from 1 (one) to thousands or even millions, according to the camera capabilities (FIG. 2). After several electronic internal operations, the infrared radiation sensed by these pixels is coded to a matrix (Table 1) that is generated by electronic circuitry (FIG. 3) or other methods. Each value in Table 1 corresponds to incident radiation registered by a specific pixel of the sensor converted to a final value representing the adjusted temperature of the subject. U.S. Pat. No. 5,420,419 to Wood shows an example of an infrared camera employing this type of sensor.

TABLE 1

Sample value matrix

| ... | ... | ... | ... | ... | ... | ... | ... | ... | ... | ... | ... | ... | ... | ... |
|---|---|---|---|---|---|---|---|---|---|---|---|---|---|---|
| ... | 45.00 | 45.00 | 44.80 | 44.60 | 44.30 | 44.10 | 43.60 | 43.30 | 43.30 | 42.60 | 40.50 | 37.90 | 36.70 | ... |
| ... | 45.00 | 44.90 | 45.10 | 45.20 | 45.20 | 45.10 | 44.70 | 44.70 | 44.60 | 44.60 | 44.00 | 42.20 | 40.70 | ... |
| ... | 44.90 | 45.30 | 45.60 | 46.00 | 46.10 | 46.00 | 45.60 | 45.60 | 45.20 | 44.40 | 43.40 | 43.20 | 42.00 | ... |
| ... | 45.00 | 45.50 | 45.80 | 46.20 | 46.50 | 46.30 | 45.90 | 46.10 | 46.60 | 46.30 | 45.90 | 44.90 | 41.90 | ... |
| ... | 44.50 | 44.90 | 45.50 | 46.00 | 46.00 | 45.90 | 45.90 | 46.50 | 47.60 | 48.10 | 47.70 | 46.50 | 42.50 | ... |
| ... | 43.00 | 43.90 | 44.50 | 44.90 | 45.70 | 46.90 | 47.70 | 48.30 | 48.70 | 48.80 | 49.00 | 48.20 | 45.90 | ... |
| ... | 44.80 | 45.40 | 45.90 | 46.80 | 47.40 | 48.60 | 49.30 | 49.50 | 49.60 | 49.70 | 50.00 | 49.60 | 48.30 | ... |
| ... | 45.60 | 45.80 | 45.70 | 46.10 | 48.00 | 49.20 | 50.10 | 50.50 | 50.80 | 50.90 | 51.10 | 50.80 | 49.90 | ... |
| ... | 46.00 | 46.40 | 47.40 | 48.00 | 49.50 | 50.60 | 51.00 | 51.70 | 52.20 | 52.30 | 52.50 | 52.10 | 51.30 | ... |
| ... | 47.40 | 48.00 | 49.30 | 50.10 | 51.30 | 52.00 | 53.00 | 53.70 | 54.00 | 54.40 | 54.40 | 54.00 | 53.30 | ... |
| ... | 48.60 | 49.50 | 50.50 | 51.30 | 52.50 | 53.80 | 55.00 | 55.90 | 56.30 | 56.60 | 56.70 | 56.40 | 55.70 | ... |

TABLE 1-continued

Sample value matrix

| | | | | | | | | | | | | | |
|---|---|---|---|---|---|---|---|---|---|---|---|---|---|
| ... | 49.30 | 50.90 | 51.70 | 52.90 | 54.50 | 55.90 | 57.10 | 58.20 | 58.90 | 59.70 | 60.30 | 60.50 | 60.10 | ... |
| ... | 49.90 | 52.20 | 53.60 | 54.80 | 56.20 | 57.50 | 59.00 | 61.30 | 65.10 | 67.10 | 68.40 | 68.90 | 68.60 | ... |
| ... | 50.70 | 53.30 | 55.10 | 56.80 | 58.80 | 61.40 | 64.80 | 68.30 | 71.20 | 74.30 | 76.30 | 77.50 | 77.50 | ... |
| ... | 52.30 | 54.40 | 56.60 | 59.80 | 65.80 | 69.70 | 72.00 | 74.90 | 77.90 | 81.20 | 83.50 | 85.20 | 86.00 | ... |
| ... | 53.70 | 56.20 | 61.50 | 67.00 | 71.20 | 74.70 | 78.00 | 81.50 | 84.70 | 87.90 | 90.90 | 92.90 | 94.20 | ... |
| ... | 55.20 | 60.90 | 67.10 | 71.10 | 74.40 | 78.90 | 82.10 | 86.10 | 90.10 | 93.90 | 97.00 | 99.00 | 100.60 | ... |
| ... | 57.80 | 65.10 | 70.10 | 72.80 | 77.40 | 81.90 | 85.20 | 88.40 | 93.80 | 98.80 | 101.90 | 104.10 | 105.70 | ... |
| ... | 61.30 | 66.10 | 70.80 | 75.90 | 80.00 | 83.00 | 85.90 | 92.30 | 99.60 | 104.00 | 106.70 | 108.40 | 109.50 | ... |
| ... | 64.30 | 68.10 | 72.30 | 77.20 | 82.00 | 86.40 | 92.70 | 100.20 | 105.60 | 108.50 | 110.10 | 111.40 | 112.30 | ... |
| ... | 66.30 | 70.30 | 74.50 | 79.90 | 86.90 | 94.70 | 100.90 | 106.30 | 109.80 | 111.50 | 112.40 | 113.10 | 114.30 | ... |
| ... | 67.90 | 70.40 | 73.50 | 80.20 | 92.00 | 101.70 | 106.90 | 110.20 | 112.90 | 115.10 | 115.70 | 115.40 | 114.50 | ... |
| ... | 70.00 | 72.80 | 74.40 | 80.40 | 96.10 | 105.60 | 109.90 | 113.20 | 115.20 | 117.60 | 118.80 | 117.50 | 109.30 | ... |
| ... | 71.50 | 74.60 | 75.50 | 84.70 | 100.30 | 108.70 | 112.10 | 115.40 | 117.80 | 119.00 | 118.60 | 111.70 | 94.40 | ... |
| ... | 71.70 | 73.60 | 76.50 | 91.10 | 105.30 | 112.00 | 114.40 | 116.60 | 119.30 | 120.00 | 113.30 | 95.70 | 74.20 | ... |
| ... | 71.60 | 72.90 | 80.90 | 96.40 | 108.60 | 114.20 | 116.50 | 117.90 | 117.10 | 114.70 | 99.80 | 75.90 | 59.00 | ... |
| ... | 71.10 | 72.70 | 84.00 | 100.00 | 110.70 | 115.60 | 118.20 | 118.90 | 114.30 | 100.90 | 79.30 | 59.20 | 51.30 | ... |
| ... | 70.80 | 72.50 | 85.10 | 101.40 | 112.20 | 116.70 | 119.30 | 120.10 | 113.70 | 92.30 | 65.80 | 51.50 | 48.70 | ... |
| ... | ... | ... | ... | ... | ... | ... | ... | ... | ... | ... | ... | ... | ... | ... |
| ... | 69.10 | 69.40 | 85.90 | 104.00 | 113.00 | 116.20 | 116.00 | 110.40 | 93.70 | 71.70 | 56.90 | 49.80 | 47.70 | ... |
| ... | 69.10 | 70.60 | 86.10 | 103.50 | 112.50 | 115.20 | 113.00 | 101.30 | 81.40 | 63.20 | 54.90 | 50.80 | 48.30 | ... |
| ... | 70.00 | 70.00 | 86.30 | 103.40 | 111.90 | 114.60 | 109.90 | 93.60 | 72.20 | 58.60 | 53.60 | 51.80 | 49.80 | ... |

This final matrix was obtained and decoded by a calibrated internal firmware or software to correspond to actual temperatures of the aimed at objects. Several correction factors built in the factory and adjusted in the field are included in these values. These processed values are then mounted to form electronic images, contained between the technical camera limits, independent on the camera type or model with which they were produced, and also independent of the observed object type, mechanical, electrical, masonry, plastic, organic, biological, or live organism etc. These built images can be presented in black, white and gray, or converted automatically to a false color scale.

Irrespective of electronic circuitry and internal software used or developed by any manufacturer, the entire infrared information is translated to a visual format that can be recognized by the human eye for neural and cognitive processing. The purpose of usual processing software or firmware applied to these images is to transform this values matrix in different black and white or false color tones that are more or less identifiable by the human eye whereby making the identification of regions of increased or lowered temperatures easier as can be seen in the two mugs shown in FIGS. 4a and 4b.

Another typical commercial software conversion changes the original values matrix or "black and white" images produced by the electronic circuitry and resident software to specific color arrangements producing false color images as shown in FIGS. 5a-c. This is done in order to attempt to build more suitable images for the human retina since its middle region is more capable to see in colors than in black and white due our biological retina cell structure called cones and rods. The result of conventional processing can be seen also in FIGS. 8a, 8b and 8c, and is explained in detail below. However, the final results obtained are poor and analyzing them is tiring to the human eye and brain leading the infrared camera operators to become easily tired and to commit more errors. Such errors lead to large financial losses.

Actually commercially available color coding processes applied on any infrared image lack the precision mixing for many colors and negatively impact the truly important technical information available to the user, mainly when the temperature differences are not so expressive. This happens because the black and white rod and color cones of human retina are not mimicked or emulated by the commercial color arrangements available on the market. The actually commercially available infrared false colored images are saturated with colors and lack precision and discrimination for a comfortable and clear and economic productive diagnosis of infrared image contents.

SUMMARY OF THE INVENTION

This invention relates to a process for converting the traditional thermal images visual presentation into a much more suitable visual format for the human eye and brain. The images are converted to negative black and white and specific split colors are added causing a substantial difference in the way the retina and brain processes the resultant images. This method reduces significantly the eye fatigue during the work day, increases the technician perception and makes the interpreting mental process a lot easier since the hottest part of the image, usually the most important, is clearly enhanced by the proper mixing of inverted black and white tones and color ones.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5a-c show three actual commercial false color infrared images of the mugs in FIG. 4a;

FIG. 16a shows a thermal image of an oven with actual commercial "iron" false colors schemes added;

FIG. 16b shows a thermal image of an oven with actual commercial "rainbow" false colors schemes added;

FIG. 17 shows a thermal image of an oven using an exemplary embodiment of the invention. The image was converted from infrared to inverted back-and-white (X-ray) with false color split added;

FIG. 18 shows the color RGB 103 103 103;

FIG. 24 shows the hotspot RGB color code and correlated color of the hotspot selected in FIG. 23a;

FIGS. 28a-d show acomparative effect of applying twice the X-ray effect to the same thermal image, wherein duing the step of mixing the color tones and the black and white tones into a single image, more than one set of the black and white tones are applied to the image for image enhancing purposes.

DETAILED DESCRIPTION OF THE INVENTION

This application relates to a new coding process for infrared images, which are generated from a temperature values matrix obtained from an electronic infrared sensitive circuitry and coded to a generic false color (usually the commercial, most used and known as iron or rainbow or black and white) pattern. By the use of the method of the invention, the images are coded into a negative black and white pattern with a soft color split separation whereby producing a large visualization contrast of parts or sectors of the registered infrared image object indicating critical or important temperature changes.

The present technical process transforms the basic output visual information produced by the infrared cameras, either by an analog matrix or digital files, using a specific mixing with false colors and black and white palettes mixed in such a way that the final infrared image is presented integrating smoothly a negative black and white visual image with balanced color tones producing a large discrimination effect. This optimum result is due to the fact that the total color scheme of the final images mimics the human retina. Also, the images processed by this technique mimic the photographic X-ray effect that provides a standardized way of viewing, is universally and easily recognizable, and includes different color scales attached to different temperature levels.

There is a large advantage to using the photographic X-ray effect because it uses the photographically well known black and white and grey tones to invert images. In this context the "inverted" black and white refers old "negative" photographic films. In the old films "black" in the negative chemical film means brighter on the photo (or photographic paper) and "white" means darker due the effect this tones produces when "revealed" or "turned" to photographic paper. As X-rays are still used today and make use of this traditional inversion effect, it is very easy to understand what the content information of the image is. There is no difference to the human retina, but to interpret or understand the images content, it is an easy and worldwide-recognized format.

In a particular embodiment, this technique involves the utilization of a single color scale for all the processed images that is poorly effective when used to understand the information contained in the image.

Figure 6:
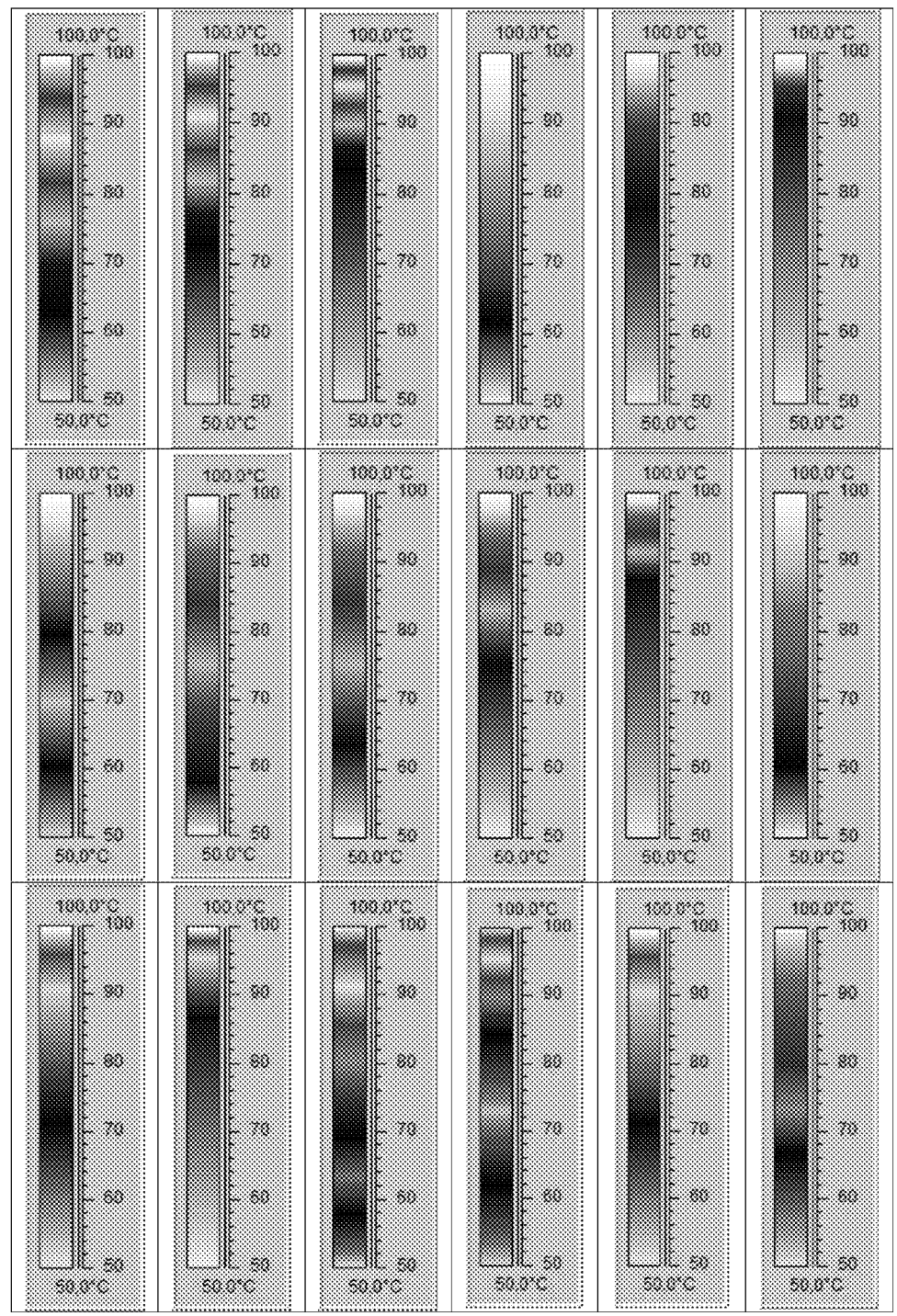
FIG. 6 shows eighteen different examples of different colors mixed with inverted black and white tones arrangements assigned to the same specific temperature range (0° C. to 100° C.)

Since the infrared radiation emitted by the subject hits a pixel of the sensor, with a resultant electrical or digital value of it attributed to every sensor pixel, then being calibrated and correlated in factory to represent the actual temperature of the subject, it is feasible to code this values to a color RGB (Red, Green and Blue) arrangement, such that the human eye and brains cognitive processing results in a very clear and understandable visual image. To split a visible light into its fundamental components red (R) green (G) and blue (B) is a well know physical principle, known as visual light decomposing in its fundamental colors, and is the standard way to manage visual light composing electronic systems. There are several color arrangements that can be utilized always following the general rule of mixing specific high contrast colors and an inverted or not-inverted black white and gray portion of the entire image. FIG. 6 shows several examples of these possible schemes. All of them apply the same general principle and rule of creating an X-ray type image mixed with false colors that is the embodiment of this invention. A particular black and white distribution case can be seen in FIG. 6 second line, first scale from the left to right, and third line, third and fourth scales from left to right where the black and white portion of the scale is repeated twice. The final result of this particular arrangement can be seen in FIGS. 28*a-d* where the X-ray type effect is still retained.

As can be seen in FIG. 6, a large quantity of different color arrangements is possible. Also, as the lower and upper temperature limits of each image can be calibrated on the very camera, the color schemes must only be correlated proportionally to the maximum and minimum displayed temperatures, independent of the particular software, firmware or electronic circuitry adopted to produce the infrared images. This can be applied to any manufacturer or infrared or system camera as any infrared camera video output will always have to be optimized to the human eye response to color and black and white tones.

Figure 1:
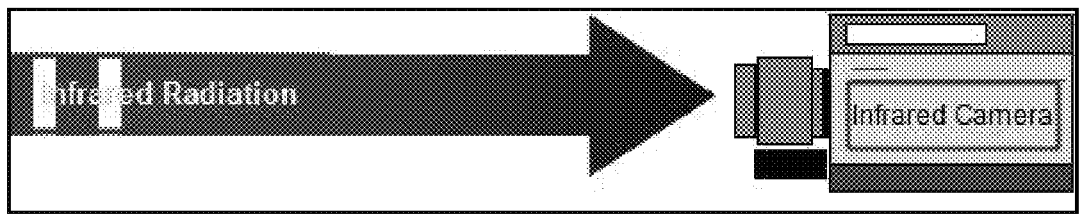
FIG. 1 shows a schematic representation of infrared radiation entering an infrared camera.
Figure 2:
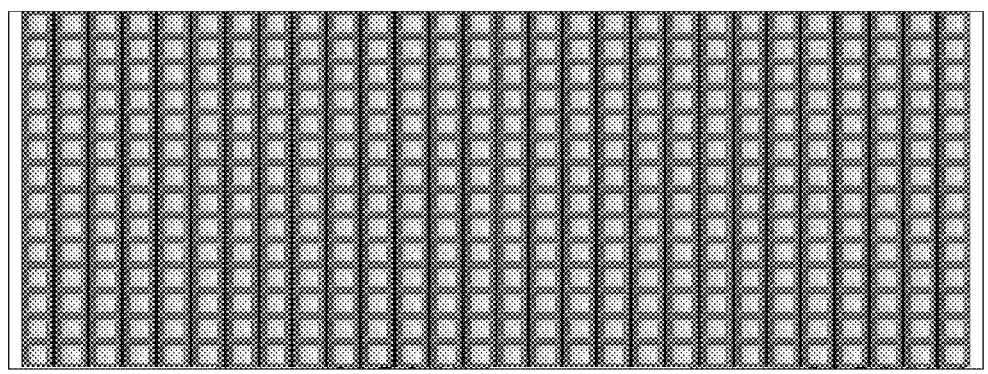
FIG. 2 shows an example of a part of an electronic sensor matrix of an infrared camera.
Figure 3:
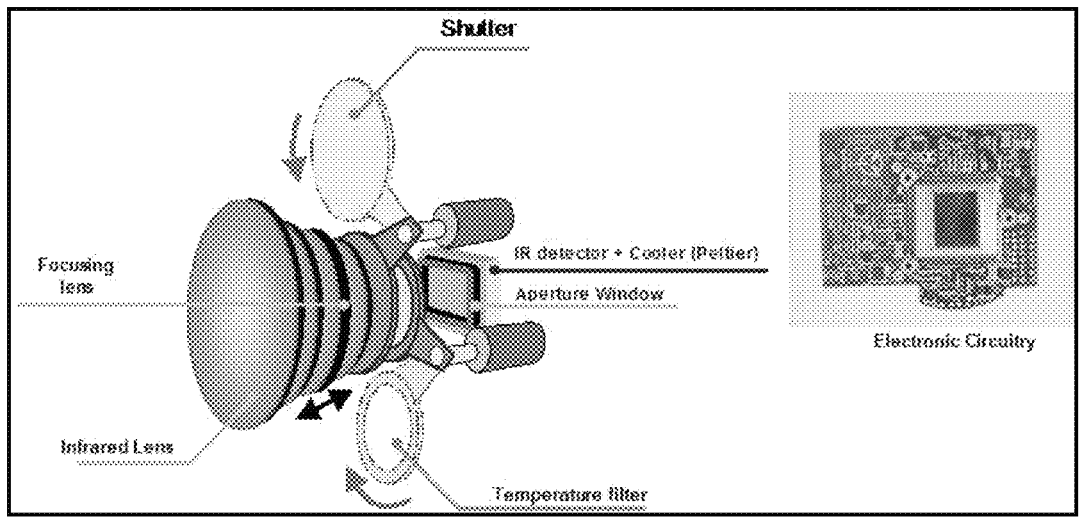
FIG. 3 shows a general schematic of the lenses and detector electronic circuitry that generates the infrared values matrix.
Figures 4A, 4B:
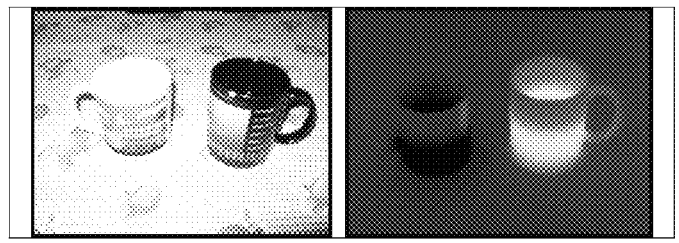
FIG. 4a shows visible light image of two mugs one with hot and one with cool water inside.
FIG. 4b shows a simple black and white infrared image of the mugs in FIG. 4a wherein brighter tones are related to hotter areas on the mugs and darker tones to colder areas.
Figures 5A, 5B, 5C:
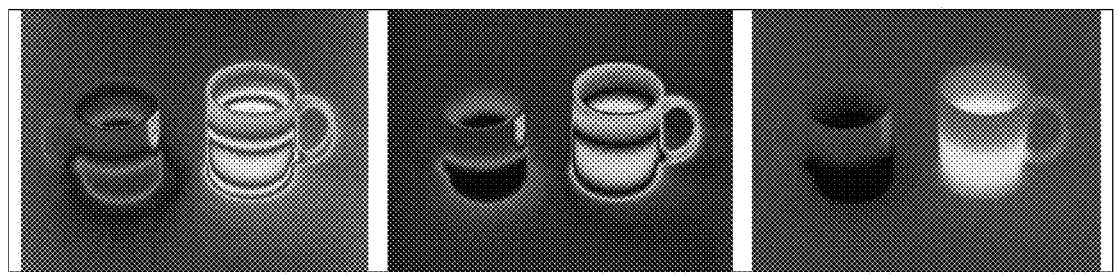
Figure 7:
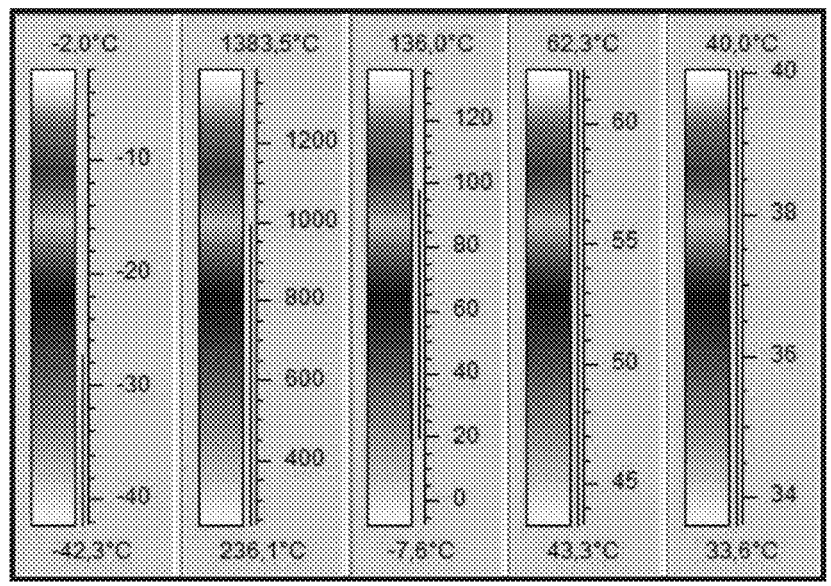
FIG. 7 shows an exemplary of the same color scheme assigned to different temperature ranges.

Also, the same process can be applied to any temperature range as can be seen in FIG. 7. It can be noted easily that the color distribution scheme generated by this technique is the same, but that the limit temperature ranges varies among others from −42.3° C. to −2° C., from −7.6° C. to 136° C., and from 236.1° C. to 1,383.5° C. This coding system is sufficiently flexible to be used with any temperature range.

According to this invention, any infrared camera, regardless of the specific electronic circuitry architecture it employs, or any internal software or firmware, has to produce a final visual video signal output that passes through a code processing or algorithm to convert the original infrared—invisible to the human eye—signal in a colored one—visible to the human eye. This application refers to a universal solution that is independent of the camera type, camera circuitry, camera firmware or software, or post-processing software for treatment of the original images, or even the temperature limits, and is not being limited by any of these factors.

An illustrative example of a generic temperature pixel correlation that enables this image transformation is shown in Table 2. This table shows RGB values that are associated with particular temperature values generated by any infrared camera This table refers to RGB codes that are applied to an image that starts at 0° C. and goes to 500° C. There are 256 code lines in this example for the number 256 is a typical multiple of the 8 bit words and it is common knowledge that every image pixel of infrared information can be translated in 8 bits per color, or 256 color shades per pixel. This makes it possible to represent a visual output with about 16.7 millions of different color and that makes the 256 color systems very common and used too in several visible light image data processing files.

In any event, the total number of color lines will vary according the hardware and software capacity and infrared camera design. For example, older cameras can only manage 120 color lines. Also, the number of colors is not limited; the more colors or lines are used, the softer the image will be. In Table 2, the lines are numbered for demonstration purposes and every temperature related to each line is identified at the right column. Then using RGB codes, the original infrared matrix values are translated electronically to colors and presented on the thermovision LCD, viewfinder or computer screen.

TABLE 2

RGB Values Associated with Particular Temperature Values

| LINE | R | G | B | COLOR | TEMP. |
|---|---|---|---|---|---|
| 1 | 248 | 248 | 248 | Almost White | 500° C. |
| 2 | 248 | 248 | 248 | | 498° C. |
| 3 | 247 | 247 | 231 | | 496° C. |
| 4 | 246 | 246 | 214 | | 494° C. |
| 5 | 246 | 245 | 196 | | 492° C. |
| 6 | 245 | 244 | 179 | | 490° C. |
| 7 | 244 | 243 | 162 | | 488° C. |
| 8 | 243 | 241 | 145 | | 486° C. |
| 9 | 242 | 240 | 128 | | 484° C. |
| 10 | 242 | 239 | 110 | | 482° C. |
| 11 | 241 | 238 | 93 | | 481° C. |
| 12 | 240 | 237 | 76 | | 479° C. |
| 13 | 239 | 236 | 59 | | 477° C. |
| 14 | 239 | 228 | 74 | | 475° C. |
| 15 | 239 | 218 | 72 | | 473° C. |
| 16 | 238 | 209 | 70 | | 471° C. |
| 17 | 237 | 199 | 68 | | 469° C. |
| 18 | 237 | 190 | 66 | Yellow Gold | 467° C. |
| 19 | 236 | 181 | 64 | | 465° C. |
| 20 | 235 | 171 | 62 | | 463° C. |
| 21 | 235 | 162 | 60 | | 461° C. |
| 22 | 234 | 152 | 58 | | 459° C. |
| 23 | 233 | 143 | 56 | | 457° C. |
| 24 | 233 | 134 | 55 | | 455° C. |
| 25 | 232 | 124 | 53 | | 453° C. |
| 26 | 232 | 115 | 51 | | 451° C. |
| 27 | 231 | 105 | 49 | Orange | 449° C. |
| 28 | 230 | 96 | 47 | | 447° C. |
| 29 | 230 | 87 | 45 | | 445° C. |
| 30 | 229 | 77 | 43 | | 443° C. |
| 31 | 228 | 68 | 41 | | 442° C. |
| 32 | 228 | 58 | 39 | | 440° C. |
| 33 | 227 | 49 | 37 | | 438° C. |
| 34 | 220 | 49 | 36 | | 436° C. |
| 35 | 214 | 50 | 36 | | 434° C. |
| 36 | 207 | 50 | 35 | | 432° C. |
| 37 | 201 | 50 | 34 | | 430° C. |
| 38 | 194 | 51 | 34 | | 428° C. |
| 39 | 188 | 51 | 33 | Dark Red | 426° C. |
| 40 | 181 | 52 | 32 | | 424° C. |
| 41 | 175 | 52 | 32 | | 422° C. |
| 42 | 168 | 52 | 31 | | 420° C. |
| 43 | 161 | 53 | 30 | | 418° C. |
| 44 | 155 | 53 | 30 | | 416° C. |
| 45 | 148 | 53 | 29 | | 414° C. |
| 46 | 142 | 54 | 28 | | 412° C. |
| 47 | 135 | 54 | 27 | | 410° C. |
| 48 | 129 | 54 | 27 | | 408° C. |
| 49 | 122 | 55 | 26 | | 406° C. |
| 50 | 115 | 55 | 25 | | 404° C. |
| 51 | 109 | 55 | 25 | | 403° C. |
| 52 | 102 | 56 | 24 | Brown | 401° C. |
| 53 | 96 | 56 | 23 | | 399° C. |
| 54 | 89 | 57 | 23 | | 397° C. |
| 55 | 83 | 57 | 22 | | 395° C. |
| 56 | 76 | 57 | 21 | | 393° C. |
| 57 | 70 | 58 | 21 | | 391° C. |
| 58 | 63 | 58 | 20 | | 389° C. |
| 59 | 60 | 63 | 26 | | 387° C. |
| 60 | 56 | 69 | 32 | | 385° C. |
| 61 | 53 | 74 | 38 | | 383° C. |
| 62 | 50 | 79 | 44 | | 381° C. |
| 63 | 47 | 84 | 49 | | 379° C. |
| 64 | 43 | 90 | 55 | | 377° C. |
| 65 | 40 | 95 | 61 | | 375° C. |
| 66 | 37 | 100 | 67 | Dark Green | 373° C. |
| 67 | 33 | 106 | 73 | | 371° C. |
| 68 | 30 | 111 | 79 | | 369° C. |
| 69 | 34 | 115 | 86 | | 367° C. |
| 70 | 37 | 120 | 93 | | 365° C. |
| 71 | 41 | 124 | 100 | | 364° C. |
| 72 | 44 | 128 | 107 | | 362° C. |
| 73 | 48 | 133 | 114 | | 360° C. |
| 74 | 52 | 137 | 121 | | 358° C. |
| 75 | 55 | 141 | 128 | | 356° C. |

TABLE 2-continued

RGB Values Associated with Particular Temperature Values

| LINE | R | G | B | COLOR | TEMP. |
|---|---|---|---|---|---|
| 76 | 59 | 146 | 135 | | 354° C. |
| 77 | 62 | 150 | 142 | | 352° C. |
| 78 | 66 | 154 | 150 | | 350° C. |
| 79 | 70 | 159 | 157 | | 348° C. |
| 80 | 73 | 163 | 164 | | 346° C. |
| 81 | 77 | 168 | 171 | | 344° C. |
| 82 | 80 | 172 | 178 | Light Blue | 342° C. |
| 83 | 84 | 176 | 185 | | 340° C. |
| 84 | 88 | 181 | 192 | | 338° C. |
| 85 | 91 | 185 | 199 | | 336° C. |
| 86 | 95 | 189 | 206 | | 334° C. |
| 87 | 98 | 194 | 213 | | 332° C. |
| 88 | 102 | 198 | 220 | | 330° C. |
| 89 | 99 | 192 | 217 | | 328° C. |
| 90 | 95 | 186 | 214 | | 326° C. |
| 91 | 92 | 180 | 211 | | 325° C. |
| 92 | 88 | 175 | 209 | | 323° C. |
| 93 | 85 | 169 | 206 | | 321° C. |
| 94 | 81 | 163 | 203 | | 319° C. |
| 95 | 78 | 157 | 200 | | 317° C. |
| 96 | 74 | 151 | 197 | | 315° C. |
| 97 | 71 | 145 | 194 | | 313° C. |
| 98 | 67 | 140 | 192 | | 311° C. |
| 99 | 64 | 134 | 189 | | 309° C. |
| 100 | 61 | 128 | 186 | | 307° C. |
| 101 | 57 | 122 | 183 | Medium Blue | 305° C. |
| 102 | 54 | 116 | 180 | | 303° C. |
| 103 | 50 | 110 | 177 | | 301° C. |
| 104 | 47 | 104 | 174 | | 299° C. |
| 105 | 43 | 99 | 172 | | 297° C. |
| 106 | 40 | 93 | 169 | | 295° C. |
| 107 | 36 | 87 | 166 | | 293° C. |
| 108 | 33 | 81 | 163 | | 291° C. |
| 109 | 32 | 77 | 155 | | 289° C. |
| 110 | 31 | 74 | 148 | | 287° C. |
| 111 | 30 | 70 | 140 | | 286° C. |
| 112 | 28 | 67 | 132 | | 284° C. |
| 113 | 27 | 63 | 125 | | 282° C. |
| 114 | 26 | 60 | 117 | | 280° C. |
| 115 | 25 | 56 | 109 | | 278° C. |
| 116 | 24 | 53 | 102 | | 276° C. |
| 117 | 23 | 49 | 94 | Dark blue | 274° C. |
| 118 | 22 | 46 | 86 | | 272° C. |
| 119 | 20 | 42 | 79 | | 270° C. |
| 120 | 19 | 38 | 71 | | 268° C. |
| 121 | 18 | 35 | 64 | | 266° C. |
| 122 | 17 | 31 | 56 | | 264° C. |
| 123 | 16 | 28 | 48 | | 262° C. |
| 124 | 15 | 24 | 41 | | 260° C. |
| 125 | 13 | 21 | 33 | | 258° C. |
| 126 | 12 | 17 | 25 | | 256° C. |
| 127 | 11 | 14 | 18 | | 254° C. |
| 128 | 10 | 10 | 10 | Black | 252° C. |
| 129 | 12 | 12 | 12 | | 250° C. |
| 130 | 13 | 13 | 13 | | 248° C. |
| 131 | 15 | 15 | 15 | | 247° C. |
| 132 | 17 | 17 | 17 | | 245° C. |
| 133 | 18 | 18 | 18 | | 243° C. |
| 134 | 20 | 20 | 20 | | 241° C. |
| 135 | 22 | 22 | 22 | | 239° C. |
| 136 | 23 | 23 | 23 | | 237° C. |
| 137 | 25 | 25 | 25 | | 235° C. |
| 138 | 27 | 27 | 27 | | 233° C. |
| 139 | 28 | 28 | 28 | | 231° C. |
| 140 | 30 | 30 | 30 | | 229° C. |
| 141 | 32 | 32 | 32 | | 227° C. |
| 142 | 34 | 34 | 34 | | 225° C. |
| 143 | 35 | 35 | 35 | | 223° C. |
| 144 | 37 | 37 | 37 | | 221° C. |
| 145 | 39 | 39 | 39 | | 219° C. |
| 146 | 40 | 40 | 40 | | 217° C. |
| 147 | 42 | 42 | 42 | | 215° C. |
| 148 | 44 | 44 | 44 | | 213° C. |
| 149 | 45 | 45 | 45 | | 211° C. |
| 150 | 47 | 47 | 47 | | 209° C. |
| 151 | 49 | 49 | 49 | | 208° C. |
| 152 | 50 | 50 | 50 | | 206° C. |
| 153 | 52 | 52 | 52 | | 204° C. |
| 154 | 54 | 54 | 54 | | 202° C. |
| 155 | 55 | 55 | 55 | | 200° C. |
| 156 | 57 | 57 | 57 | | 198° C. |
| 157 | 59 | 59 | 59 | | 196° C. |
| 158 | 60 | 60 | 60 | | 194° C. |
| 159 | 62 | 62 | 62 | | 192° C. |
| 160 | 64 | 64 | 64 | | 190° C. |
| 161 | 65 | 65 | 65 | | 188° C. |
| 162 | 67 | 67 | 67 | | 186° C. |
| 163 | 69 | 69 | 69 | | 184° C. |
| 164 | 70 | 70 | 70 | | 182° C. |
| 165 | 72 | 72 | 72 | | 180° C. |
| 166 | 74 | 74 | 74 | | 178° C. |
| 167 | 76 | 76 | 76 | | 176° C. |
| 168 | 77 | 77 | 77 | | 174° C. |
| 169 | 79 | 79 | 79 | | 172° C. |
| 170 | 81 | 81 | 81 | | 170° C. |
| 171 | 82 | 82 | 82 | | 169° C. |
| 172 | 84 | 84 | 84 | | 167° C. |
| 173 | 86 | 86 | 86 | | 165° C. |
| 174 | 87 | 87 | 87 | | 163° C. |
| 175 | 89 | 89 | 89 | | 161° C. |
| 176 | 91 | 91 | 91 | | 159° C. |
| 177 | 92 | 92 | 92 | | 157° C. |
| 178 | 94 | 94 | 94 | | 155° C. |
| 179 | 96 | 96 | 96 | | 153° C. |
| 180 | 97 | 97 | 97 | | 151° C. |
| 181 | 99 | 99 | 99 | Dark Grey | 149° C. |
| 182 | 101 | 101 | 101 | | 147° C. |
| 183 | 102 | 102 | 102 | | 145° C. |
| 184 | 104 | 104 | 104 | | 143° C. |
| 185 | 106 | 106 | 106 | | 141° C. |
| 186 | 107 | 107 | 107 | | 139° C. |
| 187 | 109 | 109 | 109 | | 137° C. |
| 188 | 111 | 111 | 111 | | 135° C. |
| 189 | 112 | 112 | 112 | | 133° C. |
| 190 | 114 | 114 | 114 | | 131° C. |
| 191 | 116 | 116 | 116 | | 130° C. |
| 192 | 118 | 118 | 118 | | 128° C. |
| 193 | 119 | 119 | 119 | | 126° C. |
| 194 | 121 | 121 | 121 | | 124° C. |
| 195 | 123 | 123 | 123 | | 122° C. |
| 196 | 124 | 124 | 124 | | 120° C. |
| 197 | 126 | 126 | 126 | | 118° C. |
| 198 | 128 | 128 | 128 | | 116° C. |
| 199 | 129 | 129 | 129 | | 114° C. |
| 200 | 131 | 131 | 131 | | 112° C. |
| 201 | 133 | 133 | 133 | | 110° C. |
| 202 | 134 | 134 | 134 | | 108° C. |
| 203 | 136 | 136 | 136 | | 106° C. |
| 204 | 138 | 138 | 138 | | 104° C. |
| 205 | 139 | 139 | 139 | | 102° C. |
| 206 | 141 | 141 | 141 | | 100° C. |
| 207 | 143 | 143 | 143 | | 98° C. |
| 208 | 144 | 144 | 144 | | 96° C. |
| 209 | 146 | 146 | 146 | | 94° C. |
| 210 | 148 | 148 | 148 | | 92° C. |
| 211 | 149 | 149 | 149 | | 91° C. |
| 212 | 151 | 151 | 151 | | 89° C. |
| 213 | 153 | 153 | 153 | | 87° C. |
| 214 | 154 | 154 | 154 | | 85° C. |
| 215 | 156 | 156 | 156 | | 83° C. |
| 216 | 158 | 158 | 158 | | 81° C. |
| 217 | 160 | 160 | 160 | | 79° C. |
| 218 | 161 | 161 | 161 | | 77° C. |
| 219 | 163 | 163 | 163 | | 75° C. |
| 220 | 165 | 165 | 165 | | 73° C. |
| 221 | 166 | 166 | 166 | | 71° C. |
| 222 | 168 | 168 | 168 | | 69° C. |
| 223 | 170 | 170 | 170 | | 67° C. |
| 224 | 171 | 171 | 171 | | 65° C. |
| 225 | 173 | 173 | 173 | | 63° C. |
| 226 | 175 | 175 | 175 | | 61° C. |

TABLE 2-continued

RGB Values Associated with Particular Temperature Values

| LINE | R | G | B | COLOR | TEMP. |
|------|-----|-----|-----|------------|--------|
| 227  | 176 | 176 | 176 |            | 59° C. |
| 228  | 178 | 178 | 178 |            | 57° C. |
| 229  | 180 | 180 | 180 |            | 55° C. |
| 230  | 181 | 181 | 181 |            | 53° C. |
| 231  | 183 | 183 | 183 |            | 52° C. |
| 232  | 185 | 185 | 185 |            | 50° C. |
| 233  | 186 | 186 | 186 |            | 48° C. |
| 234  | 188 | 188 | 188 |            | 46° C. |
| 235  | 190 | 190 | 190 |            | 44° C. |
| 236  | 191 | 191 | 191 |            | 42° C. |
| 237  | 193 | 193 | 193 |            | 40° C. |
| 238  | 195 | 195 | 195 |            | 38° C. |
| 239  | 196 | 196 | 196 |            | 36° C. |
| 240  | 198 | 198 | 198 |            | 34° C. |
| 241  | 200 | 200 | 200 |            | 32° C. |
| 242  | 202 | 202 | 202 |            | 30° C. |
| 243  | 203 | 203 | 203 |            | 28° C. |
| 244  | 205 | 205 | 205 |            | 26° C. |
| 245  | 207 | 207 | 207 |            | 24° C. |
| 246  | 208 | 208 | 208 |            | 22° C. |
| 247  | 210 | 210 | 210 |            | 20° C. |
| 248  | 212 | 212 | 212 |            | 18° C. |
| 249  | 213 | 213 | 213 |            | 16° C. |
| 250  | 215 | 215 | 215 |            | 14° C. |
| 251  | 217 | 217 | 217 |            | 13° C. |
| 252  | 218 | 218 | 218 |            | 11° C. |
| 253  | 220 | 220 | 220 |            | 9° C.  |
| 254  | 220 | 220 | 220 |            | 7° C.  |
| 255  | 200 | 200 | 200 |            | 5° C.  |
| 256  | 200 | 200 | 200 | Light Gray | 3° C.  |

A fixed or constant temperature correlation to each and every RGB code is not necessary since in every image, the temperatures related to every RGB code will be different and will be set by any electronic circuitry that performs this invisible-infrared-to-visible-light visual conversion. All black-and-white and color RGB codes are divided and correlated by signal processing electronic circuitry, or in post-processing software to produce a proportional, linear or non-linear, or even completely inverted (inverted black-and-white AND colors) visual output. Different black, white, grey and color scales, the different colors proportions and densities applied to the infrared images permit greater levels of discrimination for any object or scenery at which an infrared camera is aimed. Also, the number of color combinations is actually unlimited, especially when added to black and white and grey intermediary tones. Some of these combinations are shown in FIG. 6.

It is important to note that all the temperature ranges shown in FIG. 6 are the same (50° C. to 100° C.) and that there are color examples with one or even two black-and-white inverted color tones. This demonstrates the main concept of this invention that is to use the color tones mixed with inverted black and white and grey tones to create an excellent discrimination on the infrared information converted to visible light and presented to the human eye and brain. This enhanced discrimination can be easily seen when comparing the effect of its application on FIGS. 10, 11 and 12 with FIG. 13.

The general algorithm for modifying infrared images includes softly splitting the image into two levels, without limitation. The vast majority applications will use first level from top to bottom, containing the colors to be interpreted following the intuitive meaning of colors; the "whiter" the tones, the warmer the spots seen by the infrared camera and the "blacker" or "darker" the tones, the colder the part of the thermal image. In the second level, the inverted black and white (mimicking or emulating the universally well known X-ray photographic films) part of the thermal image has the important function to create an environment reference using not meaningful temperatures. The X-ray part of the image will permit to locate precisely where the hot spot is, and to mentally discard the "non-important" temperatures, but will preserve the colored "important" ones, in this way creating a higher level of interpretational security with a lower visual, brain stress, as can clearly be seen in FIG. 12. The process of mixing of any color tones with the inverted black and white is the main factor that allows for the creation of visual comfort and increases the accuracy of the thermal image interpretation. It is not critical which color scale or proportion is used by the designer.

The main advantage of this new specific mixing process is the excellent characterization and easy localization of the interest points or spots. Due to palette division between inverted black white added to colors palettes, all reference areas are made clearer (explicit), wherein the color area represents the interest temperatures and the inverted black and white (in negative) areas gives the exact context localization of the interest area. Actual existing commercial color schemes applied to infrared images (e.g., "iron" or "rainbow") do not utilize this division and result in a significantly poorer discrimination of any infrared image with a bigger eye and mental stress by the end of a working day. This can be seen in FIGS. 11 and 12.

Figure 8A:
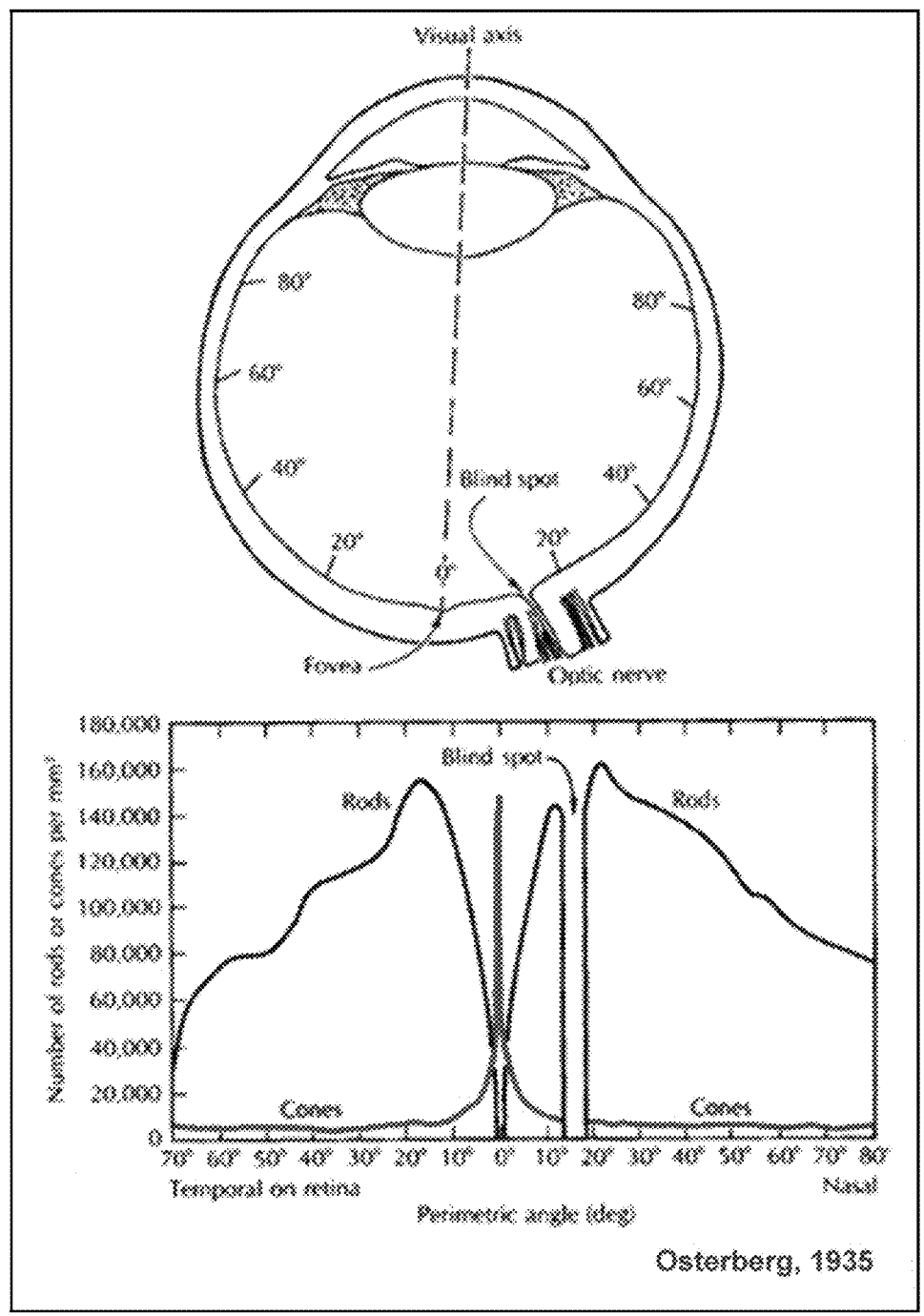
FIG. 8a shows the distribution of cones and rods on the retina being the fovea the central posterior point of the eye (Osterberg, 1935. See also Hecht, Eugene, Optics, 2nd Ed, Addison Wesley, 1987)
Figure 8B:
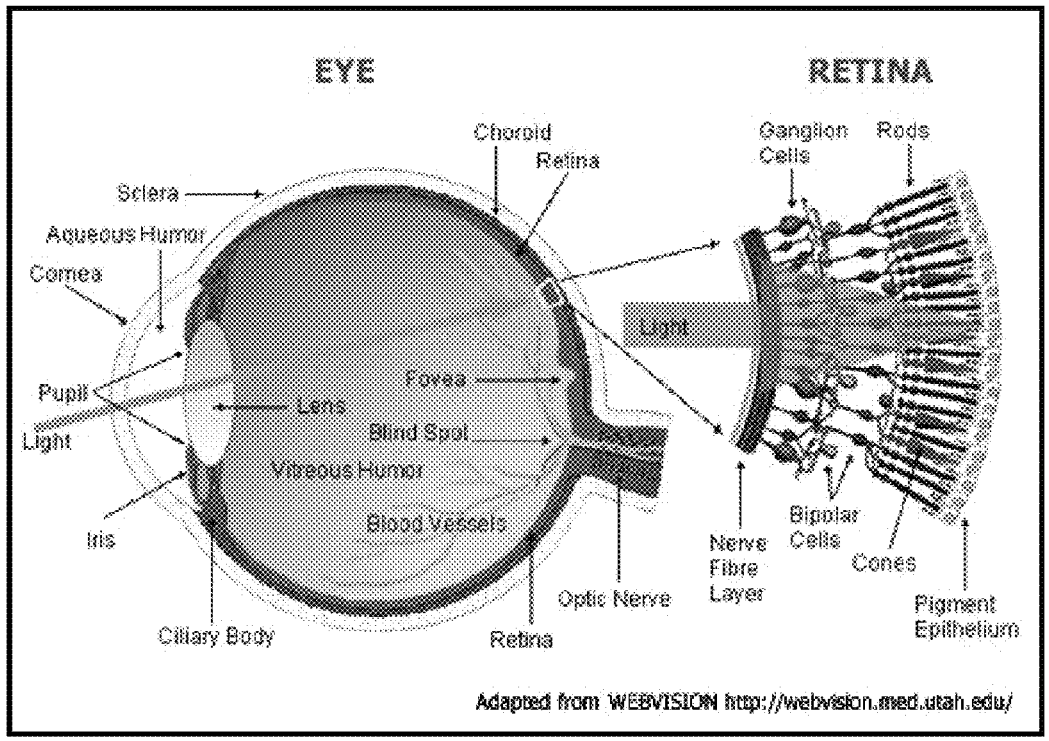
FIG. 8b shows a schematic diagram of the human retina, enhancing the cones (RGB sensor cells) and cones (B&W sensor cells)
Figure 8C:
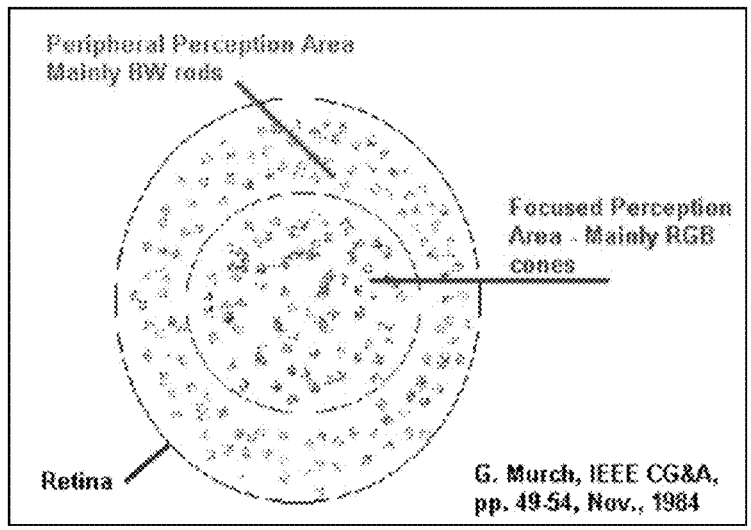
FIG. 8c shows the cones and rods concentration distribution as seen through the direct axis of the eye.

The specific coding process described herein mimics the human eye retina characteristics making the images far more suitable to interpretation than those using only false colors. FIG. 8a shows a didatic horizontal cut of the eye and, just bellow it, a graphic showing the color sensors (cones) and black and white sensors (rods) distribution along the angles quoted in the schematic cut, above the curves. As can be seen on this graphic curves, the human retina has most of the color sensors (cones—red curve) located at the bottom of each eye (0° or fovea) and the black and white sensors (rods—black curve) located mainly spread through the sides of the retina (peak between 25° and) 45° with respect to the fovea position. FIG. 8b shows the general schematic for the cones and rods distributions making it clear the different cones sensitives for RED, GREEN and BLUE (RGB) frequencies of the visible light. FIG. 8c shows the same FIG. 8a curve distribution between cones RGB and rods B&W but as if seen through the central eye axis.

There are about 6.5 to 7 million cones in each eye, and they are sensitive to bright light and to color. The highest concentration of cones is in the macula, a point near the middle rear of the eye globe retina. The fovea centralis, at the center of the macula, contains only cones and no rods. By the other side, there are about 120 to 130 million rods in each eye, and they are sensitive to dim light or presence of light or not (that translates to white or black tones), to movement, and to shapes. The higher concentration of rods is in the peripheral retina, decreasing in density up to the macula. It can be easily seen from the numbers above, that the rods or white and black cells are about 20 times greater than the cones or color cells in the retina. Also, the central point of the eye, the fovea is dedicated to color perception since it has no rods in it and the peripheral of the retina is dedicated to white and black tones (light presence or not). These are the reasons for why building an image mimicking this arrangement makes the image faster and easier to understand and decode and less tiring to the human eye and brain. As the original radiated infrared information is perceived neither by the human eye nor by the brain, it is difficult to interpret such images if they are built completely with false colors. Mimicking or emulating the sensors proportions of the human retina makes these images much more natural to see and interpret. They appear to the operators' eyes and brain much more clearly and more well defined than any images treated with false color schemes only.

Figure 9:
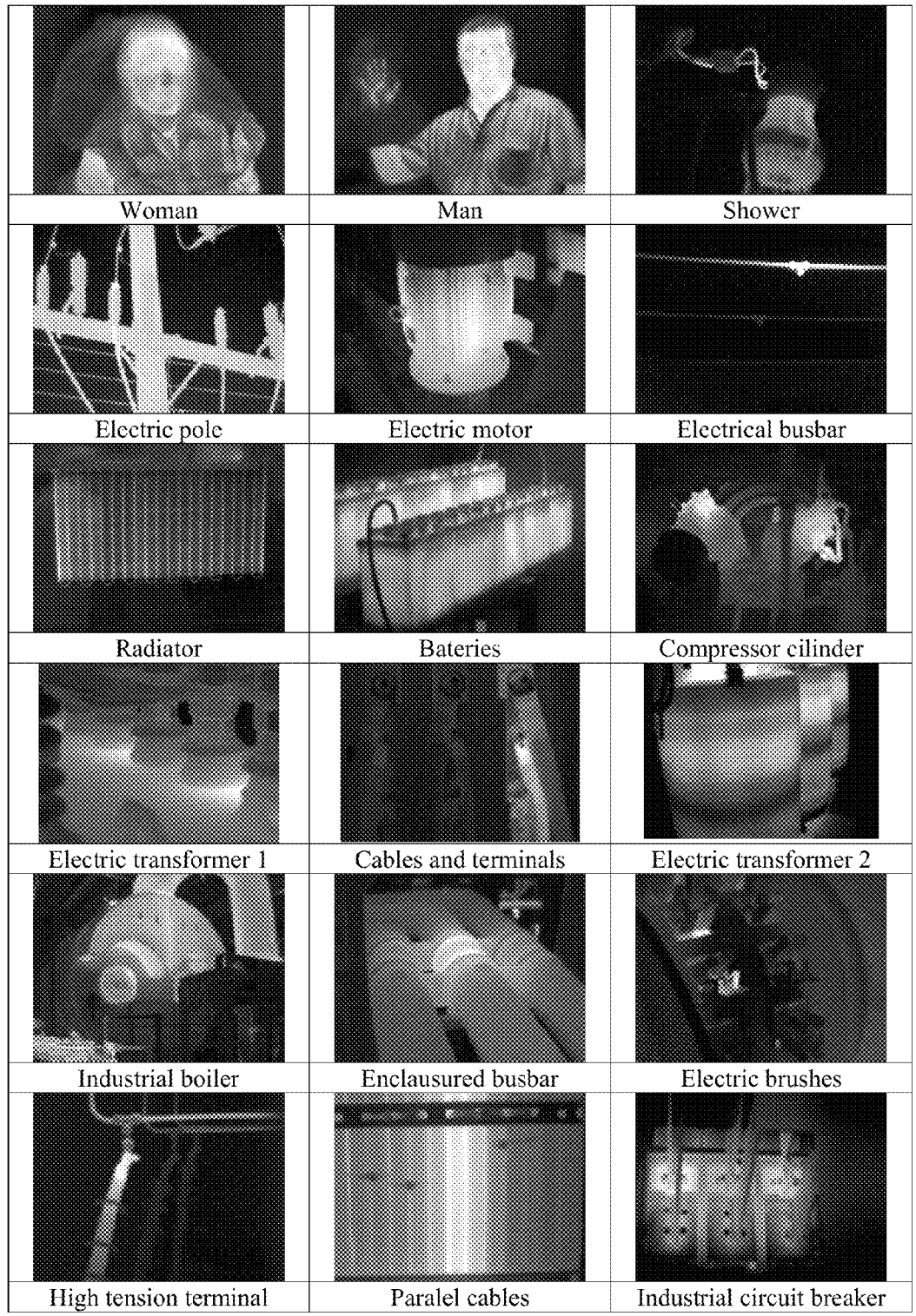
FIG. 9 shows unprocessed basic original (black and white) infrared images. All images were subjected to the same thermal adjustments and limits. (The whiter the image area the hotter it is)
Figure 10:
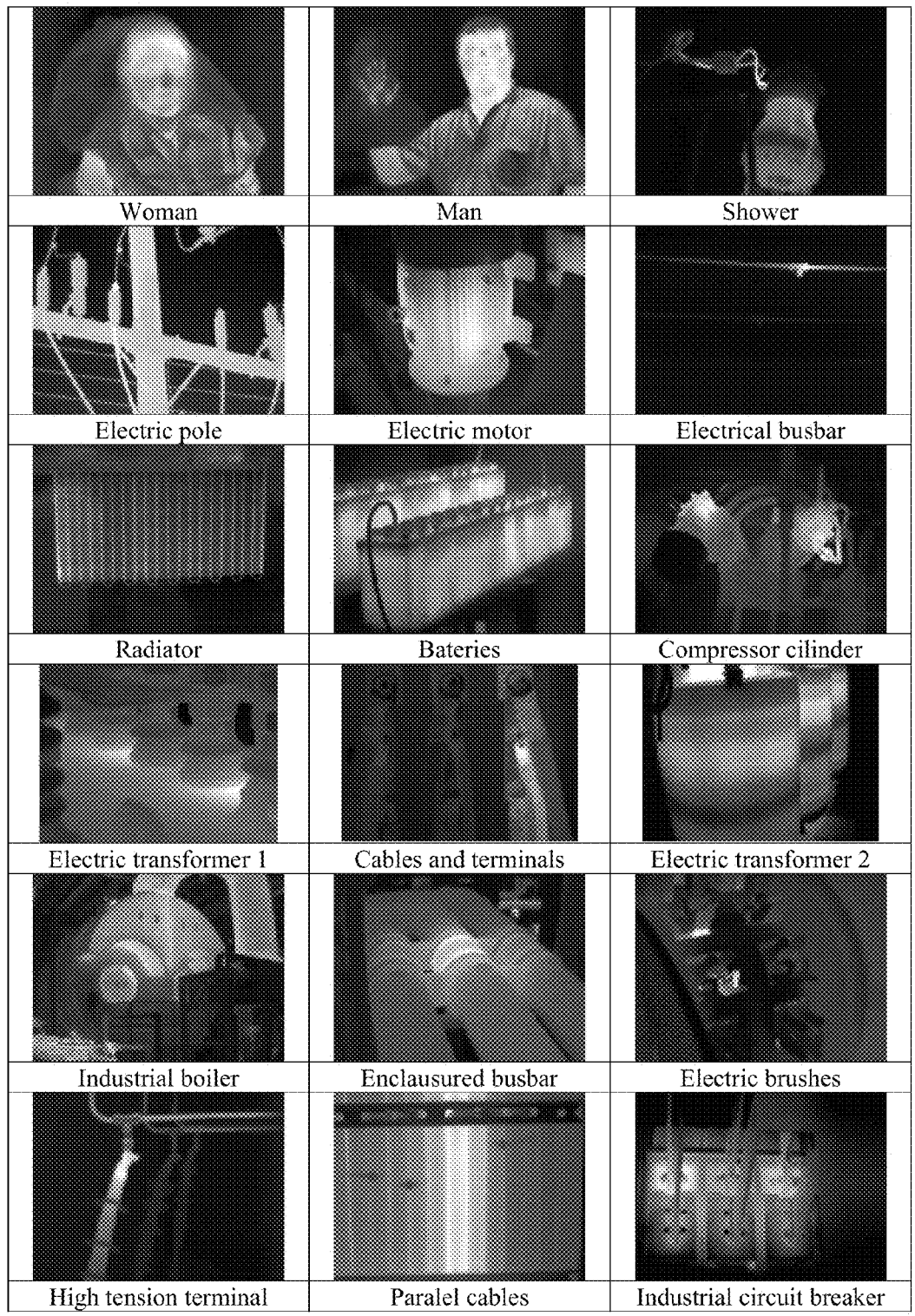
FIG. 10 shows processed infrared images processed using commercial false color "iron" scheme. All images were subjected to the same thermal adjustments and limits. (The yellower the image area the hotter it is)
Figure 11:
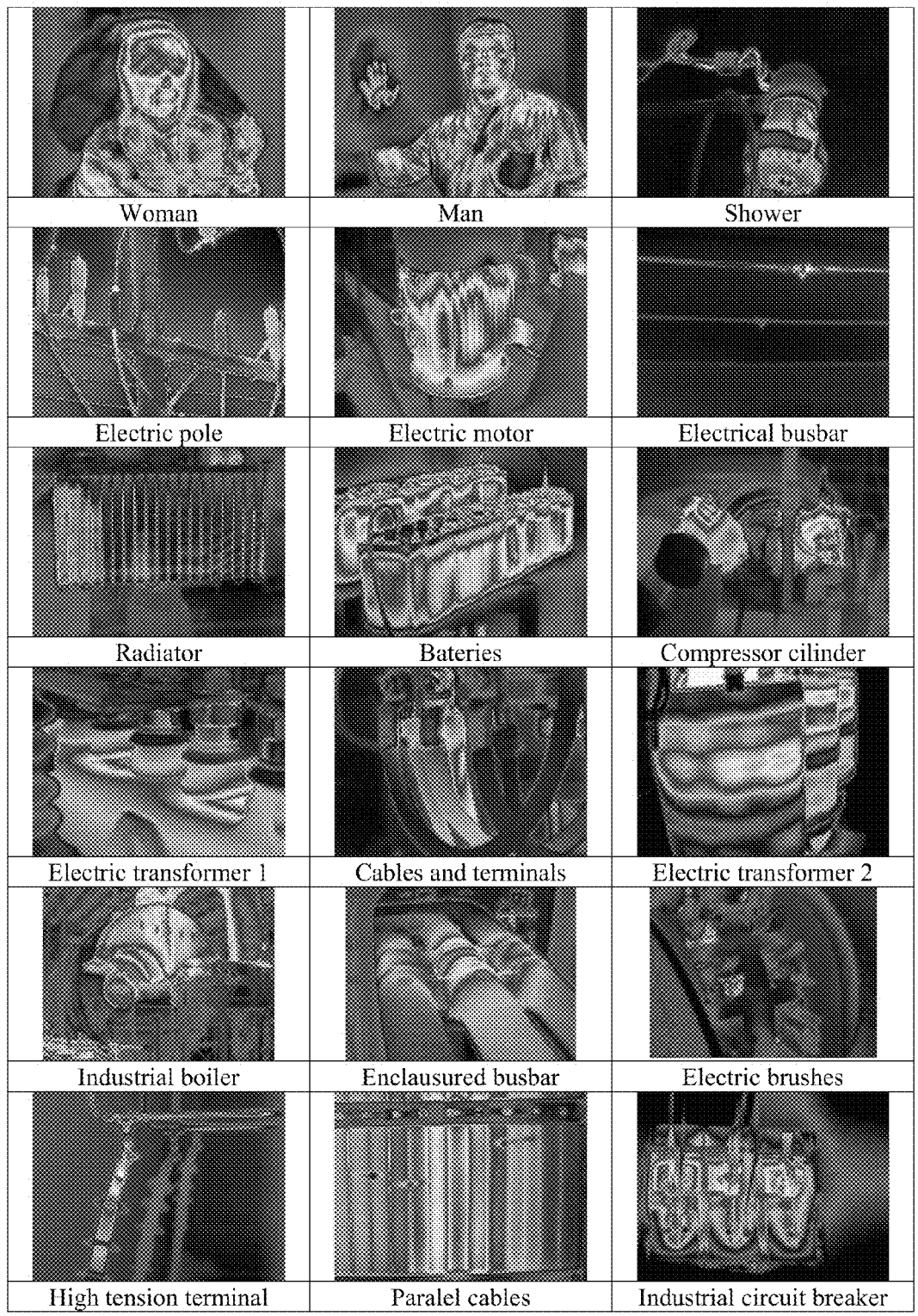
FIG. 11 shows processed infrared images processed using commercial false color "rainbow" color scheme. All images were subjected to the same thermal adjustments and limits. (The whiter the image area the hotter it is)
Figure 12:
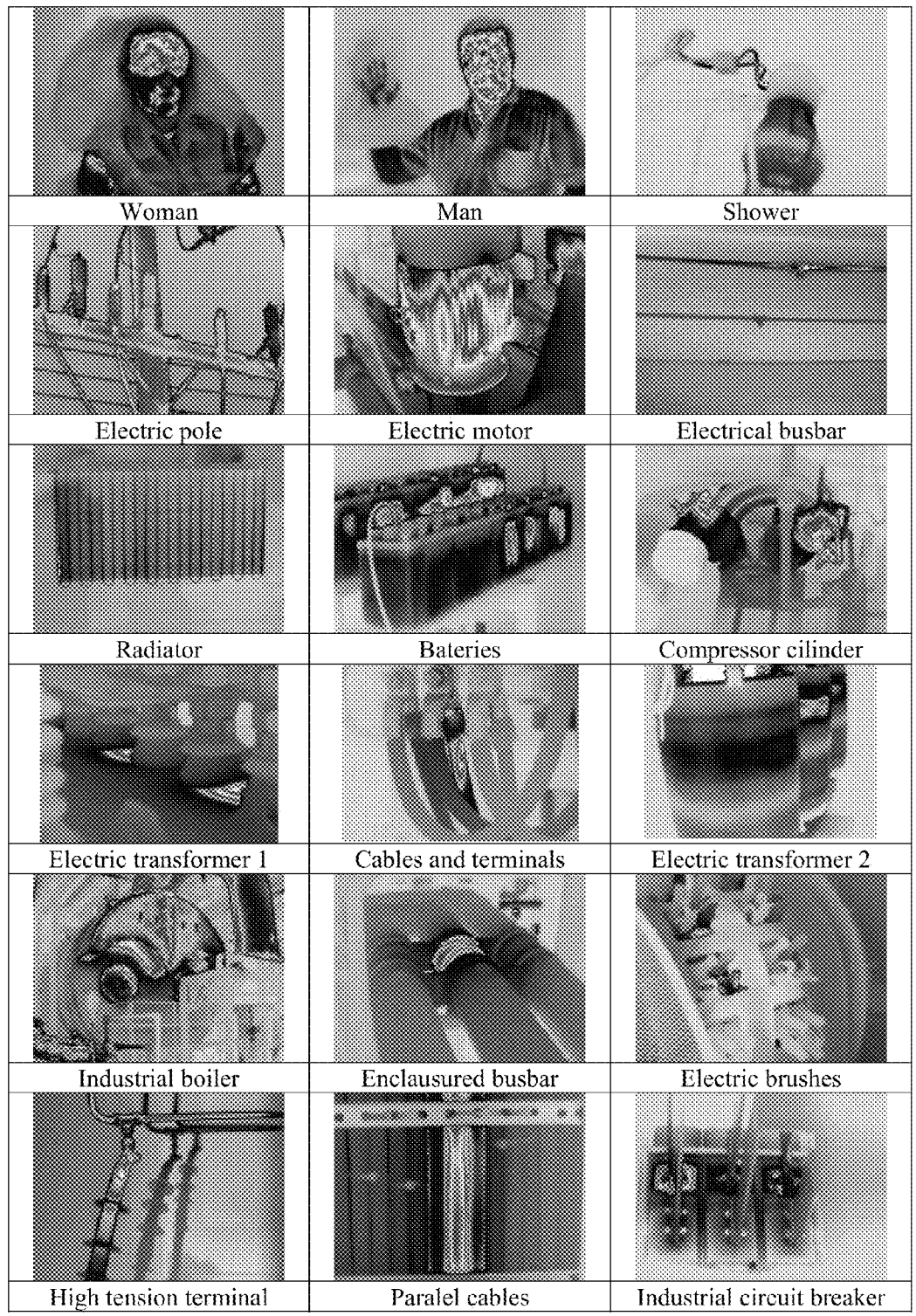
FIG. 12 shows processed infrared images processed using an exemplary embodiment of the invention. The images were converted from infrared to inverted back-and-white (X-ray) with false color split added. All images were submitted to the same thermal adjustments and limits. (The whiter the image area the, hotter it is)

FIGS. 9-21 illustrate this invention further. FIG. 9 shows common infrared images generated by common infrared cameras available on the market without using any specific software processing (so called, raw black-and-white infrared images). All images in FIGS. 9 to 12 were calibrated at the same adjustments. FIG. 10 shows common false color palette scheme ("iron") applied to infrared images. FIG. 11 shows the same images processed using another false color palette scheme ("rainbow"). FIG. 12 shows the same images processed by software calibrated to apply color separation adding inverted black and white (negative film photographic or X-ray effect) to all the temperatures of the infrared image. The progression of figures shows how much simpler and clearer the images become when they are subjected to the methods described herein. The methods described herein can be applied to any image obtained from any thermal or infrared camera.

With specific reference to the "High Tension Terminal" thermal image shown in the lower left-hand corner in FIG. 9, electrical components suffering from certain problems are identified by higher temperature registered by an infrared camera. Except of the defective component, the rest of the image is presented on a homogeneous dark gray scale tone, or similar. The poor contrast that shows the thermal differences is produced by regular software available on the market that correlates brighter tones of gray, up to white, to hotter temperatures. Other usual color schemes applied to the same thermal image correlate colors such as red, yellow orange, green, blue or violet to the entire infrared image can be seen in FIGS. 10 and 11 with similar color saturation and poor discrimination. An increased discrimination quality of the same image, when the inverted black and white tones with split colors are applied, can be seen at FIG. 12.

The process according to this invention, by means of modifications introduced on any software or firmware that generates this type of image, mixes the black and white (inverted or non-inverted) codification for the parts of the objects that doesn't show important thermal differences and adds a specific color scheme to those parts that indicate an anomaly. The added colors contrast with the black and white (inverted or non-inverted) reference palette. This process "clarifies" significantly infrared images, making them a lot easier to understand and judge, increasing significantly the correct evaluations and lowering stress and fatigue associated with viewing infrared images.

Multiple anomalies can be seen with this processing that could not be clearly seen using other schemes, e.g., by changing the intensity and proportions of the color saturation. This can be seen comparing the images on FIGS. 9 to 11 with FIG. 12. Another benefit of this mixing process is to make more complex interpretations available to less trained technicians since the coding process enhances what should be looked for in an infrared image and its use is much simpler and easier than use of images which introduce false colors.

In addition, in many cases, a visible-light control image is no longer needed since the X-ray format makes the surroundings clearer than the false colors used conventionally. This allows ink and paper to be saved with evident ecological benefits. The specific digital and or electronic algorithms according to this invention that will be made available to every commercial camera, or firmware, or even post processing software will vary on the electronic or software language the manufacturer chooses to use to produce its cameras and software. Nevertheless to obtain the advantages of an excellent discrimination and resolution to any processed infrared image, a retina mimicking scheme of color with inverted black and white mixing shall be used, i.e., black-and-white tones will be mixed with high contrast colors.

EXAMPLES

Example 1

Grayscale Infrared Image

Figure 13:
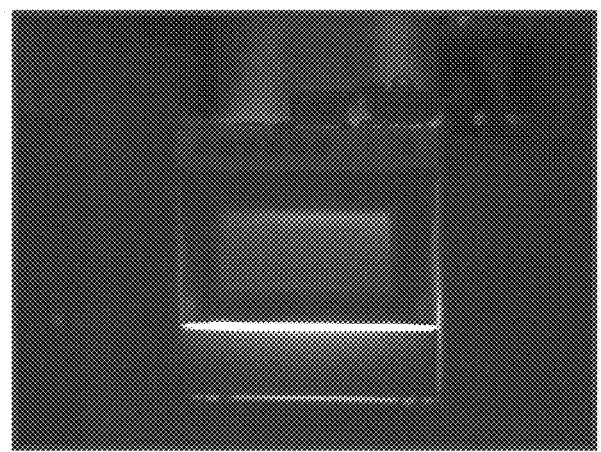
FIG. 13 shows a common black and white thermal image of an oven.

An infrared image of a kitchen oven was taken using a 320×240 pixel infrared sensor. The infrared image is shown in FIG. 13 without a temperature reference scale by its side. Every pixel of this image has a temperature value associated with it. Because of the large number of values obtained (320×240=76800), a partial listing is shown in Table 3. The complete listing is shown in Table 8, which is appended hereto on a compact disc. The file on the compact disc is labeled Table__8.txt. Although in this example, a 320×240 sensor size is used, this method is applicable for sensors of any sizes, bigger or smaller. In addition, although there are several parameters that can be adjusted to obtain the infrared image this image, such as optical focus, ambient temperature, optics temperature, target emissivity, wind speed (if any), reflected temperature and so on, this method is applicable to the final visual video output regardless whether such prior adjustments have or have not been made.

TABLE 3

Temperature Values of a Kitchen Oven as Measured by 320 × 240 pixel Infrared Sensor (Partial Listing)

| LINES | COLUMNS | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | ... |
| 1 | 21.4 | 21.4 | 21.5 | 21.5 | 21.6 | 21.5 | 21.4 | 21.4 | 21.5 | 21.5 | 21.5 | 21.3 | 21.4 | 21.3 | ... |
| 2 | 21.5 | 21.5 | 21.5 | 21.5 | 21.5 | 21.5 | 21.5 | 21.3 | 21.5 | 21.3 | 21.3 | 21.5 | 21.3 | 21.3 | ... |
| 3 | 21.5 | 21.5 | 21.6 | 21.6 | 21.6 | 21.5 | 21.5 | 21.6 | 21.6 | 21.5 | 21.7 | 21.6 | 21.4 | 21.5 | ... |
| 4 | 21.5 | 21.4 | 21.5 | 21.6 | 21.6 | 21.7 | 21.8 | 21.6 | 21.7 | 21.4 | 21.3 | 21.4 | 21.3 | 21.2 | ... |
| 5 | 21.3 | 21.5 | 21.5 | 21.6 | 21.6 | 21.6 | 21.6 | 21.5 | 21.5 | 21.4 | 21.2 | 21.6 | 21.4 | 21.1 | ... |
| 6 | 21.5 | 21.5 | 21.8 | 21.6 | 21.9 | 21.8 | 21.6 | 21.6 | 21.7 | 21.6 | 21.5 | 21.5 | 21.6 | 21.6 | ... |
| 7 | 21.5 | 21.6 | 21.8 | 21.6 | 21.8 | 21.6 | 21.6 | 21.6 | 21.6 | 21.6 | 21.6 | 21.6 | 21.3 | 21.5 | ... |
| 8 | 21.5 | 21.6 | 21.8 | 21.5 | 21.7 | 21.6 | 21.6 | 21.7 | 21.8 | 21.8 | 21.8 | 21.5 | 21.7 | 21.5 | ... |
| 9 | 21.5 | 21.6 | 21.6 | 21.7 | 22 | 21.6 | 21.6 | 21.5 | 21.8 | 21.8 | 21.4 | 21.5 | 21.5 | 21.3 | ... |
| 10 | 21.6 | 21.6 | 21.6 | 21.8 | 21.8 | 21.6 | 21.6 | 21.7 | 21.6 | 21.8 | 21.7 | 21.7 | 21.5 | 21.5 | ... |
| 11 | 21.9 | 21.7 | 21.7 | 21.9 | 21.8 | 21.8 | 21.8 | 21.6 | 21.7 | 21.9 | 21.5 | 21.6 | 21.6 | 21.5 | ... |
| 12 | 21.7 | 21.7 | 21.6 | 21.8 | 21.7 | 21.9 | 21.5 | 21.7 | 21.8 | 21.9 | 21.7 | 21.6 | 21.5 | 21.5 | ... |
| 13 | 21.5 | 21.5 | 21.6 | 21.7 | 21.9 | 21.9 | 21.8 | 21.8 | 21.9 | 21.8 | 21.8 | 21.5 | 21.4 | 21.6 | ... |

TABLE 3-continued

Temperature Values of a Kitchen Oven as Measured by 320 × 240 pixel Infrared Sensor (Partial Listing)

| LINES | \multicolumn{14}{c|}{COLUMNS} |
|---|---|---|---|---|---|---|---|---|---|---|---|---|---|---|---|

| LINES | 1 | 2 | 3 | 4 | 5 | 6 | 7 | 8 | 9 | 10 | 11 | 12 | 13 | 14 | ... |
|---|---|---|---|---|---|---|---|---|---|---|---|---|---|---|---|
| 14 | 21.5 | 21.6 | 21.6 | 21.6 | 21.8 | 21.9 | 21.7 | 21.8 | 21.8 | 21.8 | 21.8 | 21.6 | 21.4 | 21.4 | ... |
| 15 | 21.6 | 21.7 | 21.8 | 21.8 | 21.8 | 21.9 | 21.7 | 21.7 | 21.8 | 21.8 | 21.8 | 21.8 | 21.6 | 21.6 | ... |
| 16 | 21.6 | 21.6 | 21.5 | 21.9 | 21.9 | 21.6 | 21.5 | 21.7 | 21.6 | 21.6 | 21.6 | 21.5 | 21.6 | 21.5 | ... |
| 17 | 21.5 | 21.7 | 21.6 | 21.8 | 21.9 | 21.6 | 21.8 | 21.7 | 21.8 | 21.7 | 21.5 | 21.5 | 21.5 | 21.6 | ... |
| 18 | 21.5 | 21.6 | 21.6 | 21.9 | 22 | 21.9 | 21.8 | 21.7 | 21.7 | 21.8 | 21.6 | 21.9 | 21.5 | 21.5 | ... |
| 19 | 21.9 | 21.6 | 21.6 | 21.9 | 21.9 | 21.8 | 21.8 | 21.7 | 21.8 | 21.8 | 21.7 | 21.8 | 21.7 | 21.5 | ... |
| 20 | 21.5 | 21.6 | 21.8 | 21.8 | 21.8 | 21.9 | 21.7 | 21.8 | 21.8 | 21.7 | 21.8 | 21.7 | 21.5 | 21.6 | ... |
| 21 | 21.5 | 21.7 | 21.7 | 21.8 | 21.9 | 21.8 | 21.8 | 21.9 | 21.8 | 21.8 | 21.8 | 21.8 | 21.6 | 21.6 | ... |
| 22 | 21.6 | 21.6 | 21.7 | 21.9 | 21.9 | 21.7 | 21.7 | 21.8 | 21.8 | 21.6 | 21.9 | 21.8 | 21.6 | 21.6 | ... |
| 23 | 21.7 | 21.6 | 21.6 | 21.9 | 21.9 | 21.9 | 21.9 | 21.6 | 21.8 | 21.7 | 21.7 | 21.5 | 21.8 | 21.6 | ... |
| 24 | 21.8 | 21.6 | 21.7 | 21.8 | 22.1 | 21.9 | 21.9 | 21.8 | 21.9 | 21.8 | 21.7 | 21.8 | 21.8 | 21.6 | ... |
| 25 | 21.5 | 21.6 | 21.6 | 21.6 | 21.8 | 21.8 | 21.8 | 21.8 | 21.7 | 21.9 | 21.8 | 21.7 | 21.6 | 21.6 | ... |
| 26 | 21.5 | 21.4 | 21.8 | 21.8 | 21.9 | 22 | 21.9 | 21.9 | 21.8 | 21.8 | 21.8 | 21.6 | 21.8 | 21.7 | ... |
| 27 | 21.6 | 21.7 | 21.6 | 21.9 | 22 | 21.8 | 21.7 | 21.8 | 21.8 | 21.6 | 21.7 | 21.7 | 21.6 | 21.6 | ... |
| 28 | 21.6 | 21.7 | 21.7 | 21.9 | 22 | 21.9 | 21.7 | 21.9 | 21.8 | 21.9 | 21.6 | 21.5 | 21.6 | 21.6 | ... |
| 29 | 21.5 | 21.6 | 21.8 | 21.9 | 21.7 | 21.8 | 21.8 | 21.8 | 21.8 | 21.6 | 21.3 | 21.5 | 21.3 | 21.5 | ... |
| 30 | 21.6 | 21.6 | 21.9 | 21.8 | 21.8 | 21.9 | 21.7 | 21.7 | 21.6 | 21.6 | 21.2 | 21.4 | 21.5 | 21.6 | ... |
| 31 | 21.6 | 21.6 | 21.7 | 21.9 | 22.1 | 21.9 | 21.6 | 21.9 | 21.7 | 21.5 | 21.4 | 21.5 | 21.6 | 21.7 | ... |
| 32 | 21.5 | 21.6 | 21.9 | 21.9 | 22.2 | 22.1 | 21.8 | 21.8 | 21.6 | 21.5 | 21.5 | 21.5 | 21.6 | 21.8 | ... |
| 33 | 21.7 | 21.6 | 21.9 | 22 | 21.9 | 21.8 | 22 | 21.9 | 21.8 | 21.3 | 21.3 | 21.4 | 21.4 | 21.8 | ... |
| 34 | 21.7 | 21.6 | 21.9 | 22 | 22 | 22.1 | 21.9 | 21.6 | 21.7 | 21.7 | 21.5 | 21.3 | 21.5 | 21.5 | ... |
| 35 | 21.6 | 21.7 | 22 | 22.1 | 22.1 | 22 | 21.9 | 22 | 21.8 | 21.8 | 21.4 | 21.3 | 21.5 | 21.8 | ... |
| 36 | 21.5 | 21.8 | 21.6 | 22 | 22 | 22.1 | 22.2 | 21.9 | 21.8 | 21.6 | 21.4 | 21.6 | 21.5 | 21.7 | ... |
| 37 | 21.5 | 21.7 | 21.8 | 21.9 | 22 | 22 | 22.1 | 21.9 | 21.9 | 21.5 | 21.4 | 21.4 | 21.7 | 21.7 | ... |
| 38 | 21.8 | 21.7 | 21.9 | 21.9 | 22.3 | 22 | 22 | 21.9 | 21.8 | 21.7 | 21.3 | 21.4 | 21.3 | 21.6 | ... |
| 39 | 21.6 | 21.7 | 22 | 21.8 | 22.1 | 22 | 21.9 | 22 | 21.8 | 21.6 | 21.3 | 21.4 | 21.4 | 21.5 | ... |
| 40 | 21.6 | 21.7 | 21.8 | 22.1 | 22.3 | 22 | 21.9 | 21.8 | 21.8 | 21.7 | 21.3 | 21.4 | 21.6 | 21.6 | ... |
| 41 | 21.5 | 21.8 | 22 | 22 | 22.2 | 22.2 | 22 | 22 | 21.9 | 21.6 | 21.4 | 21.5 | 21.6 | 21.8 | ... |
| 42 | 21.7 | 21.7 | 22.1 | 22.2 | 22.2 | 22.3 | 22 | 22.1 | 22 | 21.9 | 21.5 | 21.5 | 21.7 | 21.5 | ... |
| 43 | 21.6 | 21.7 | 21.9 | 22.2 | 22.3 | 22 | 22.2 | 21.9 | 22 | 21.8 | 21.5 | 21.5 | 21.5 | 21.7 | ... |
| 44 | 21.6 | 21.8 | 21.9 | 22.3 | 22.2 | 22.3 | 22.1 | 22.1 | 22 | 21.8 | 21.5 | 21.6 | 21.7 | 21.8 | ... |
| 45 | 21.8 | 21.7 | 22 | 22 | 22.3 | 22.3 | 22.2 | 22 | 21.9 | 21.9 | 21.6 | 21.5 | 21.7 | 21.8 | ... |
| 46 | 21.6 | 21.7 | 21.8 | 22.1 | 22.3 | 22.3 | 22.3 | 22.1 | 22 | 21.9 | 21.6 | 21.6 | 21.6 | 21.9 | ... |
| 47 | 21.7 | 21.9 | 21.9 | 22.3 | 22.3 | 22.3 | 22.3 | 22.1 | 22.1 | 21.8 | 21.6 | 21.4 | 21.8 | 21.6 | ... |
| 48 | 21.7 | 21.8 | 21.8 | 22.2 | 22.4 | 22.2 | 22.3 | 22.1 | 21.9 | 21.4 | 21.4 | 21.6 | 21.8 | 21.7 | ... |
| 49 | 21.8 | 21.9 | 21.9 | 22.2 | 22.4 | 22.3 | 22.3 | 22.2 | 22.1 | 21.9 | 21.6 | 21.6 | 21.6 | 21.7 | ... |
| 50 | 21.6 | 21.9 | 21.8 | 22.2 | 22.4 | 22.3 | 22.1 | 22.1 | 22 | 21.9 | 21.5 | 21.6 | 21.7 | 21.5 | ... |
| 51 | 21.7 | 21.8 | 22.1 | 22.4 | 22.6 | 22.4 | 22.2 | 22.1 | 22.1 | 21.9 | 21.6 | 21.5 | 21.5 | 21.7 | ... |
| 52 | 21.7 | 22 | 21.9 | 22.2 | 22.5 | 22.4 | 22.3 | 22.2 | 22.2 | 22.1 | 22 | 21.8 | 21.6 | 21.6 | ... |
| 53 | 21.6 | 21.8 | 21.9 | 22.1 | 22.3 | 22.4 | 22.3 | 22.1 | 22.3 | 22.2 | 22.1 | 21.9 | 21.6 | 21.6 | ... |
| 54 | 21.5 | 21.8 | 21.9 | 21.9 | 22.3 | 22.4 | 22.1 | 22.2 | 22.1 | 22.1 | 22.2 | 22.1 | 21.6 | 21.5 | ... |
| ... | ... | ... | ... | ... | ... | ... | ... | ... | ... | ... | ... | ... | ... | ... | ... |

Figure 27:
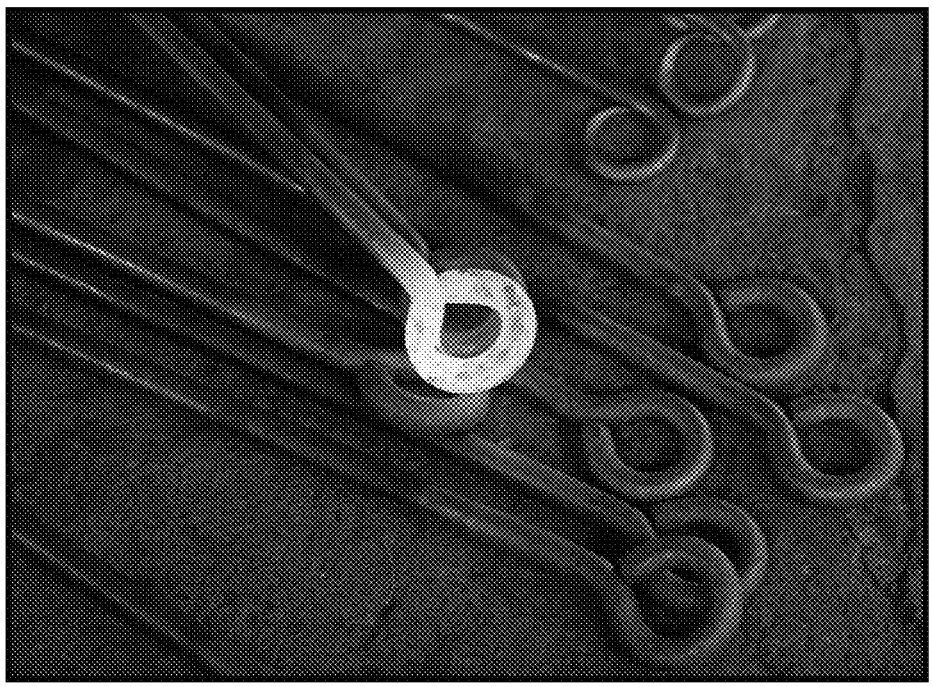
FIG. 27 shows visible light image of metal objects illustrating the principle that the warmer the temperature of portions of the objects, the whiter the light emitted by those portions.

With reference to FIG. 13, to show the infrared image, a grayscale tone is associated to every temperature. The whiter the tone, the higher the temperature, and the darker the tone, the lower the temperature. White is associated with the highest temperature and black is associated with the lowest temperature due the natural physical phenomena that all materials emits light when warmed and, the warmer the temperature, the whiter the light emitted above their own light emitting threshold. A simple demonstration of this principle can be seen in FIG. 27. All other intermediary values have their tones between white and black. To do this, it is necessary for the thermal camera or post processing software operator to choose the upper and lower temperature limits.

Figure 14:
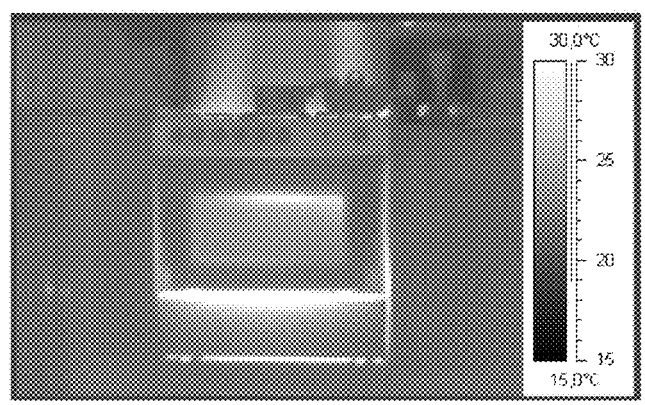
FIG. 14 shows a good quality adjustment thermal image of the FIG. 13 oven at between 15 and 30° C.
Figure 15:
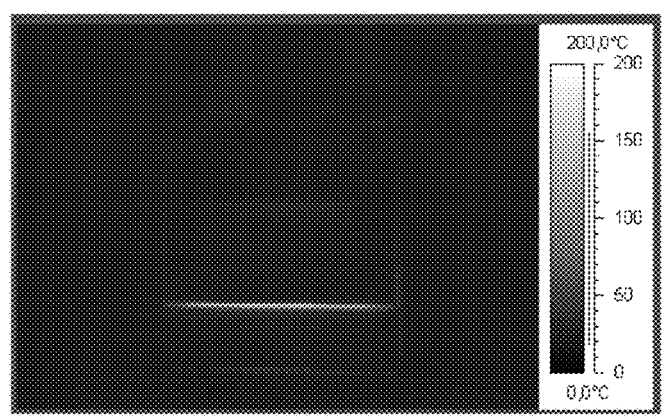
FIG. 15 shows a bad quality adjustment thermal image of the FIG. 13 oven at between 0 and 200° C.

This is attained by regulating firmware controls at the camera and this control is usually available in all thermal cameras. Another option is the operator set these values using a proper adjustment command, generally available in any pos-treatment thermal software. In this specific example, it was chosen the top of the thermal image as 30° C. and the bottom value as 15° C. to make the oven and its parts and components visible and identifiable as can be seen in FIG. 14. It is worth noting, for comparison, that if a "wrong" the upper temperature limit is set at 200° C. and the lower temperature limit is set at 0° C., an image shown in FIG. 15 would be obtained, making it very difficult, if not impossible to identify the oven's components.

When suitable upper and lower limits are chosen, every pixel value will have its temperature value proportionally presented between these two limits as can be seen at the side scales in FIGS. 14, 16*a*, 16*b* and 17. If the value of a pixel is greater or equal to say 30° in FIG. 14, it will be presented in white. If a value pixel is lower or equal to 15° C., it will be present in black. These two over limits adjustments (up and low) are common to all thermal image cameras and are not exclusive to this invention. All other values between these superior and inferior limits will be presented in a linear and proportional grey tone.

Example 2

Conventional False Color-Added Infrared Image ("Iron" and "Rainbow")

(Related Art)

Adding false colors to the image obtained in Example 1 (FIG. 13) entails a change of the conversion color RGB table algorithm recorded at the thermal camera firmware, or in the thermal pos-processing software from white-grey-black tones, to color tones. On the exemplary oven to colors, keeping the same top and bottom limits, is shown in FIGS. 16*a* and 16*b*. Similar examples of other objects are shown in FIGS. 10 and 11. As can be easily seen, colors applied by conventional methods are tiring to the eye and usually give too much color information to be interpreted and understood. Too much color stresses the operators' eyes and brain causing him or her to commit more errors as the working day advances. Such errors are very expensive for the users of infrared imaging because the spots located are generally linked to severe damages on the equipments or industrial or power instalations inspected with this technology.

Example 3

Step-by-step Procedure for Converting a Thermal Image Using Inverted Black and White Plus Color Mixing Process on FIG. 17

The following steps and considerations are followed to convert a thermal image using an exemplary process according to this invention. :

1. The color gradient that will be used in the color portion of the image must be chosen carefully. The color palette can be any of the millions of color arrangements the human eye can see but those palettes with too many colors will usually produce very confusing thermal images. In FIG. 6 there are several examples of color sequences that are added to inverted black and white tones. It shall be noted that more than 6 different colors plus black and white are usually tiring and confusing to the human eye. Nevertheless, the purpose of the invention is to split the thermal information contained in a thermal image into two parts; a first one related to the important temperatures that are represented in colors, and a second one correlated to inverted black and white tones to mimic the X-ray effect and that shows the context where the interest temperatures are immersed.

2. Every color in any arrangement has an associated RGB (Red, Green, Blue) standardized code for all computer and digital video output devices. In these codes, the red, green or blue intensities vary from 0 to 255. Being so, every color has its own three RGB number values. The color part sequence of the colors applied in FIG. 17 is shown in Table 4. The inverted black and tones or grayscale part is added bellow the color portion of the image and have their own RGB codes shown in Table 5. It shall be noted the last line of the Table 4 is the first line of the Table 5 so the total amount of lines is 256.

TABLE 4

RGB Values of Colors Shown in FIG. 17

| LINE | R | G | B | COLOR |
|---|---|---|---|---|
| 1 | 248 | 248 | 248 | Almost White |
| 2 | 248 | 248 | 248 | |
| 3 | 247 | 247 | 231 | |
| 4 | 246 | 246 | 214 | |
| 5 | 246 | 245 | 196 | |
| 6 | 245 | 244 | 179 | |
| 7 | 244 | 243 | 162 | |
| 8 | 243 | 241 | 145 | |
| 9 | 242 | 240 | 128 | |
| 10 | 242 | 239 | 110 | |
| 11 | 241 | 238 | 93 | |
| 12 | 240 | 237 | 76 | |
| 13 | 239 | 236 | 59 | |
| 14 | 239 | 228 | 74 | |

TABLE 4-continued

RGB Values of Colors Shown in FIG. 17

| LINE | R | G | B | COLOR |
|---|---|---|---|---|
| 15 | 239 | 218 | 72 | |
| 16 | 238 | 209 | 70 | |
| 17 | 237 | 199 | 68 | |
| 18 | 237 | 190 | 66 | Yellow Gold |
| 19 | 236 | 181 | 64 | |
| 20 | 235 | 171 | 62 | |
| 21 | 235 | 162 | 60 | |
| 22 | 234 | 152 | 58 | |
| 23 | 233 | 143 | 56 | |
| 24 | 233 | 134 | 55 | |
| 25 | 232 | 124 | 53 | |
| 26 | 232 | 115 | 51 | |
| 27 | 231 | 105 | 49 | Orange |
| 28 | 230 | 96 | 47 | |
| 29 | 230 | 87 | 45 | |
| 30 | 229 | 77 | 43 | |
| 31 | 228 | 68 | 41 | |
| 32 | 228 | 58 | 39 | |
| 33 | 227 | 49 | 37 | |
| 34 | 220 | 49 | 36 | |
| 35 | 214 | 50 | 36 | |
| 36 | 207 | 50 | 35 | |
| 37 | 201 | 50 | 34 | |
| 38 | 194 | 51 | 34 | |
| 39 | 188 | 51 | 33 | Dark Red |
| 40 | 181 | 52 | 32 | |
| 41 | 175 | 52 | 32 | |
| 42 | 168 | 52 | 31 | |
| 43 | 161 | 53 | 30 | |
| 44 | 155 | 53 | 30 | |
| 45 | 148 | 53 | 29 | |
| 46 | 142 | 54 | 28 | |
| 47 | 135 | 54 | 27 | |
| 48 | 129 | 54 | 27 | |
| 49 | 122 | 55 | 26 | |
| 50 | 115 | 55 | 25 | |
| 51 | 109 | 55 | 25 | |
| 52 | 102 | 56 | 24 | Brown |
| 53 | 96 | 56 | 23 | |
| 54 | 89 | 57 | 23 | |
| 55 | 83 | 57 | 22 | |
| 56 | 76 | 57 | 21 | |
| 57 | 70 | 58 | 21 | |
| 58 | 63 | 58 | 20 | |
| 59 | 60 | 63 | 26 | |
| 60 | 56 | 69 | 32 | |
| 61 | 53 | 74 | 38 | |
| 62 | 50 | 79 | 44 | |
| 63 | 47 | 84 | 49 | |
| 64 | 43 | 90 | 55 | |
| 65 | 40 | 95 | 61 | |
| 66 | 37 | 100 | 67 | Dark Green |
| 67 | 33 | 106 | 73 | |
| 68 | 30 | 111 | 79 | |
| 69 | 34 | 115 | 86 | |
| 70 | 37 | 120 | 93 | |
| 71 | 41 | 124 | 100 | |
| 72 | 44 | 128 | 107 | |
| 73 | 48 | 133 | 114 | |
| 74 | 52 | 137 | 121 | |
| 75 | 55 | 141 | 128 | |
| 76 | 59 | 146 | 135 | |
| 77 | 62 | 150 | 142 | |
| 78 | 66 | 154 | 150 | |
| 79 | 70 | 159 | 157 | |
| 80 | 73 | 163 | 164 | |
| 81 | 77 | 168 | 171 | |
| 82 | 80 | 172 | 178 | Light Blue |
| 83 | 84 | 176 | 185 | |
| 84 | 88 | 181 | 192 | |
| 85 | 91 | 185 | 199 | |
| 86 | 95 | 189 | 206 | |
| 87 | 98 | 194 | 213 | |
| 88 | 102 | 198 | 220 | |
| 89 | 99 | 192 | 217 | |

TABLE 4-continued

RGB Values of Colors Shown in FIG. 17

| LINE | R | G | B | COLOR |
|---|---|---|---|---|
| 90 | 95 | 186 | 214 | |
| 91 | 92 | 180 | 211 | |
| 92 | 88 | 175 | 209 | |
| 93 | 85 | 169 | 206 | |
| 94 | 81 | 163 | 203 | |
| 95 | 78 | 157 | 200 | |
| 96 | 74 | 151 | 197 | |
| 97 | 71 | 145 | 194 | |
| 98 | 67 | 140 | 192 | |
| 99 | 64 | 134 | 189 | |
| 100 | 61 | 128 | 186 | |
| 101 | 57 | 122 | 183 | Medium Blue |
| 102 | 54 | 116 | 180 | |
| 103 | 50 | 110 | 177 | |
| 104 | 47 | 104 | 174 | |
| 105 | 43 | 99 | 172 | |
| 106 | 40 | 93 | 169 | |
| 107 | 36 | 87 | 166 | |
| 108 | 33 | 81 | 163 | |
| 109 | 32 | 77 | 155 | |
| 110 | 31 | 74 | 148 | |
| 111 | 30 | 70 | 140 | |
| 112 | 28 | 67 | 132 | |
| 113 | 27 | 63 | 125 | |
| 114 | 26 | 60 | 117 | |
| 115 | 25 | 56 | 109 | |
| 116 | 24 | 53 | 102 | |
| 117 | 23 | 49 | 94 | Dark blue |
| 118 | 22 | 46 | 86 | |
| 119 | 20 | 42 | 79 | |
| 120 | 19 | 38 | 71 | |
| 121 | 18 | 35 | 64 | |
| 122 | 17 | 31 | 56 | |
| 123 | 16 | 28 | 48 | |
| 124 | 15 | 24 | 41 | |
| 125 | 13 | 21 | 33 | |
| 126 | 12 | 17 | 25 | |
| 127 | 11 | 14 | 18 | |
| 128 | 10 | 10 | 10 | Black |

TABLE 5

RGB Values of Grayscale Tones Shown in FIG. 17.

| LINE | R | G | B | COLOR |
|---|---|---|---|---|
| 1 | 10 | 10 | 10 | Black |
| 2 | 12 | 12 | 12 | |
| 3 | 13 | 13 | 13 | |
| 4 | 15 | 15 | 15 | |
| 5 | 17 | 17 | 17 | |
| 6 | 18 | 18 | 18 | |
| 7 | 20 | 20 | 20 | |
| 8 | 22 | 22 | 22 | |
| 9 | 23 | 23 | 23 | |
| 10 | 25 | 25 | 25 | |
| 11 | 27 | 27 | 27 | |
| 12 | 28 | 28 | 28 | |
| 13 | 30 | 30 | 30 | |
| 14 | 32 | 32 | 32 | |
| 15 | 34 | 34 | 34 | |
| 16 | 35 | 35 | 35 | |
| 17 | 37 | 37 | 37 | |
| 18 | 39 | 39 | 39 | |
| 19 | 40 | 40 | 40 | |
| 20 | 42 | 42 | 42 | |
| 21 | 44 | 44 | 44 | |
| 22 | 45 | 45 | 45 | |
| 23 | 47 | 47 | 47 | |
| 24 | 49 | 49 | 49 | |
| 25 | 50 | 50 | 50 | |
| 26 | 52 | 52 | 52 | |
| 27 | 54 | 54 | 54 | |
| 28 | 55 | 55 | 55 | |
| 29 | 57 | 57 | 57 | |
| 30 | 59 | 59 | 59 | |
| 31 | 60 | 60 | 60 | |
| 32 | 62 | 62 | 62 | |
| 33 | 64 | 64 | 64 | |
| 34 | 65 | 65 | 65 | |
| 35 | 67 | 67 | 67 | |
| 36 | 69 | 69 | 69 | |
| 37 | 70 | 70 | 70 | |
| 38 | 72 | 72 | 72 | |
| 39 | 74 | 74 | 74 | |
| 40 | 76 | 76 | 76 | |
| 41 | 77 | 77 | 77 | |
| 42 | 79 | 79 | 79 | |
| 43 | 81 | 81 | 81 | |
| 44 | 82 | 82 | 82 | |
| 45 | 84 | 84 | 84 | |
| 46 | 86 | 86 | 86 | |
| 47 | 87 | 87 | 87 | |
| 48 | 89 | 89 | 89 | |
| 49 | 91 | 91 | 91 | |
| 50 | 92 | 92 | 92 | |
| 51 | 94 | 94 | 94 | |
| 52 | 96 | 96 | 96 | |
| 53 | 97 | 97 | 97 | |
| 54 | 99 | 99 | 99 | Dark Grey |
| 55 | 101 | 101 | 101 | |
| 56 | 102 | 102 | 102 | |
| 57 | 104 | 104 | 104 | |
| 58 | 106 | 106 | 106 | |
| 59 | 107 | 107 | 107 | |
| 60 | 109 | 109 | 109 | |
| 61 | 111 | 111 | 111 | |
| 62 | 112 | 112 | 112 | |
| 63 | 114 | 114 | 114 | |
| 64 | 116 | 116 | 116 | |
| 65 | 118 | 118 | 118 | |
| 66 | 119 | 119 | 119 | |
| 67 | 121 | 121 | 121 | |
| 68 | 123 | 123 | 123 | |
| 69 | 124 | 124 | 124 | |
| 70 | 126 | 126 | 126 | |
| 71 | 128 | 128 | 128 | |
| 72 | 129 | 129 | 129 | |
| 73 | 131 | 131 | 131 | |
| 74 | 133 | 133 | 133 | |
| 75 | 134 | 134 | 134 | |
| 76 | 136 | 136 | 136 | |
| 77 | 138 | 138 | 138 | |
| 78 | 139 | 139 | 139 | |
| 79 | 141 | 141 | 141 | |
| 80 | 143 | 143 | 143 | |
| 81 | 144 | 144 | 144 | |
| 82 | 146 | 146 | 146 | |
| 83 | 148 | 148 | 148 | |
| 84 | 149 | 149 | 149 | |
| 85 | 151 | 151 | 151 | |
| 86 | 153 | 153 | 153 | |
| 87 | 154 | 154 | 154 | |
| 88 | 156 | 156 | 156 | |
| 89 | 158 | 158 | 158 | |
| 90 | 160 | 160 | 160 | |
| 91 | 161 | 161 | 161 | |
| 92 | 163 | 163 | 163 | |
| 93 | 165 | 165 | 165 | |
| 94 | 166 | 166 | 166 | |
| 95 | 168 | 168 | 168 | |
| 96 | 170 | 170 | 170 | |
| 97 | 171 | 171 | 171 | |
| 98 | 173 | 173 | 173 | |
| 99 | 175 | 175 | 175 | |
| 100 | 176 | 176 | 176 | |
| 101 | 178 | 178 | 178 | |
| 102 | 180 | 180 | 180 | |

TABLE 5-continued

RGB Values of Grayscale Tones Shown in FIG. 17.

| LINE | R | G | B | COLOR |
|---|---|---|---|---|
| 103 | 181 | 181 | 181 | |
| 104 | 183 | 183 | 183 | |
| 105 | 185 | 185 | 185 | |
| 106 | 186 | 186 | 186 | |
| 107 | 188 | 188 | 188 | |
| 108 | 190 | 190 | 190 | |
| 109 | 191 | 191 | 191 | |
| 110 | 193 | 193 | 193 | |
| 111 | 195 | 195 | 195 | |
| 112 | 196 | 196 | 196 | |
| 113 | 198 | 198 | 198 | |
| 114 | 200 | 200 | 200 | |
| 115 | 202 | 202 | 202 | |
| 116 | 203 | 203 | 203 | |
| 117 | 205 | 205 | 205 | |
| 118 | 207 | 207 | 207 | |
| 119 | 208 | 208 | 208 | |
| 120 | 210 | 210 | 210 | |
| 121 | 212 | 212 | 212 | |
| 122 | 213 | 213 | 213 | |
| 123 | 215 | 215 | 215 | |
| 124 | 217 | 217 | 217 | |
| 125 | 218 | 218 | 218 | |
| 126 | 220 | 220 | 220 | |
| 127 | 220 | 220 | 220 | |
| 128 | 200 | 200 | 200 | |
| 129 | 200 | 200 | 200 | Light Gray |

The grayscale tones are generated the same way the colors are, choosing almost black color or near (R=10, G=10, B=10—Line 1 in Table 5) to be the next value to be considered bellow the last color (R=G=B=—Line 127 in Table 4, coming up to down) and the brighter tone, usually a clear gray tone (R=200, G=200, B=200—Line 129 in Table 5) as being the last tone on the image. Having chosen this, the intermediary tones are simply divided by the exceeding number of lines, to sum the total amount of desired tons (100, 120, 256, etc) suitable for the physical characteristics of the camera hardware. The final result is a smooth mixing between inverted black and white and colors producing images like the ones presented at FIG. 17.

As a starting point, it is of importance to always correlate the inverted black and white portion to the lower temperatures and the color tones to the higher temperatures to produce the optimum result. As can be seen in FIG. 6, there are several different proportions on colors versus inverted black and white tones, causing different percent distribution but the general effect is always kept. But all of them follow the same mixing principle.

3. Since the upper and lower temperature limits of the image are set, the total number of colors (in this example 256) is proportionally distributed between the two extreme values.

4. The result of this division will then be electronically and proportionally and sequentially correlated to every one of the value pixels forming the final image. The pixels that have values higher that the upper temperature limit will be correlated to the first (top) line of the final color codes table. The pixels that have values lower that the lower temperature limit will be correlated to the last (bottom) line of the final color codes table. The intermediary values will be correlated correspondently to the intermediary values of the table.

Using the oven thermal image as an example, the temperature values of which are shown in Table 3, the first pixel (column 1, line 1) will have a value of 21.4° C. Because the chosen span between the upper temperature limit (30° C.) and the lower temperature limit (15° C.) is 15° C., the total span of 15° will be divided by the total of 256 colors available in this color arrangement. This will result in 0.0586 degrees per tone (15° C./256 tones=0.058594° C. per tone). Since 21.4° C. is near the lower limit of 15° than from the up limit, let's start from the bottom temperature of 15° C. in order to obtain the value of 21.4° C. The difference is then 6.4° C. or 109 tone lines from bottom to top (6.4° C./0.058594° C./tone=109.22 tones). Counting the 109 lines from bottom to top in Table 6, the correspondent color will be the RGB code of "103 103 103". This means that the pixel will have the color of FIG. 18 and this can be seen at the left top corner of the FIG. 19 since the very first pixel at the column 1 and line 1 of this thermal image has this very color.

TABLE 6

RGB Values of Colors and Grayscale Tones Shown in FIG. 17

| LINE UP | R | G | B | COLOR | LINE DOWN | TEMP |
|---|---|---|---|---|---|---|
| 1 | 248 | 248 | 248 | Almost White | 256 | 30.0° C. |
| 2 | 248 | 248 | 248 | | 255 | 29.9° C. |
| 3 | 246 | 246 | 214 | | 254 | 29.9° C. |
| 4 | 245 | 244 | 179 | | 253 | 29.8° C. |
| 5 | 243 | 241 | 145 | | 252 | 29.8° C. |
| 6 | 242 | 239 | 110 | | 251 | 29.7° C. |
| 7 | 240 | 237 | 76 | Yellow | 250 | 29.6° C. |
| 8 | 238 | 235 | 42 | | 249 | 29.6° C. |
| 9 | 239 | 218 | 72 | | 248 | 29.5° C. |
| 10 | 237 | 199 | 68 | | 247 | 29.5° C. |
| 11 | 236 | 181 | 64 | | 246 | 29.4° C. |
| 12 | 235 | 162 | 60 | | 245 | 29.4° C. |
| 13 | 233 | 143 | 56 | | 244 | 29.3° C. |
| 14 | 232 | 124 | 53 | | 243 | 29.2° C. |
| 15 | 231 | 105 | 49 | | 242 | 29.2° C. |
| 16 | 230 | 87 | 45 | | 241 | 29.1° C. |
| 17 | 228 | 68 | 41 | | 240 | 29.1° C. |
| 18 | 227 | 49 | 37 | Almost Red | 239 | 29.0° C. |
| 19 | 214 | 50 | 36 | | 238 | 28.9° C. |
| 20 | 201 | 50 | 34 | | 237 | 28.9° C. |
| 21 | 188 | 51 | 33 | | 236 | 28.8° C. |
| 22 | 175 | 52 | 32 | | 235 | 28.8° C. |
| 23 | 161 | 53 | 30 | | 234 | 28.7° C. |
| 24 | 148 | 53 | 29 | | 233 | 28.7° C. |
| 25 | 135 | 54 | 27 | | 232 | 28.6° C. |
| 26 | 122 | 55 | 26 | | 231 | 28.5° C. |
| 27 | 109 | 55 | 25 | Orange | 230 | 28.5° C. |
| 28 | 96 | 56 | 23 | | 229 | 28.4° C. |
| 29 | 83 | 57 | 22 | | 228 | 28.4° C. |
| 30 | 70 | 58 | 21 | | 227 | 28.3° C. |
| 31 | 56 | 69 | 32 | | 226 | 28.2° C. |
| 32 | 50 | 79 | 44 | | 225 | 28.2° C. |
| 33 | 43 | 90 | 55 | | 224 | 28.1° C. |
| 34 | 37 | 100 | 67 | | 223 | 28.1° C. |
| 35 | 30 | 111 | 79 | | 222 | 28.0° C. |
| 36 | 37 | 120 | 93 | | 221 | 27.9° C. |
| 37 | 44 | 128 | 107 | | 220 | 27.9° C. |
| 38 | 52 | 137 | 121 | | 219 | 27.8° C. |
| 39 | 59 | 146 | 135 | | 218 | 27.8° C. |
| 40 | 66 | 154 | 149 | | 217 | 27.7° C. |
| 41 | 73 | 163 | 164 | | 216 | 27.7° C. |
| 42 | 80 | 172 | 178 | | 215 | 27.6° C. |
| 43 | 88 | 181 | 192 | | 214 | 27.5° C. |
| 44 | 95 | 189 | 206 | | 213 | 27.5° C. |
| 45 | 102 | 198 | 220 | | 212 | 27.4° C. |
| 46 | 95 | 186 | 214 | | 211 | 27.4° C. |
| 47 | 88 | 175 | 209 | | 210 | 27.3° C. |
| 48 | 81 | 163 | 203 | | 209 | 27.2° C. |
| 49 | 74 | 151 | 197 | | 208 | 27.2° C. |
| 50 | 67 | 140 | 192 | | 207 | 27.1° C. |
| 51 | 61 | 128 | 186 | | 206 | 27.1° C. |
| 52 | 54 | 116 | 180 | | 205 | 27.0° C. |
| 53 | 47 | 104 | 174 | | 204 | 27.0° C. |
| 54 | 40 | 93 | 169 | | 203 | 26.9° C. |
| 55 | 33 | 81 | 163 | | 202 | 26.8° C. |
| 56 | 31 | 74 | 148 | | 201 | 26.8° C. |

TABLE 6-continued

RGB Values of Colors and Grayscale Tones Shown in FIG. 17

| LINE UP | R | G | B | COLOR | LINE DOWN | TEMP |
|---|---|---|---|---|---|---|
| 57 | 28 | 67 | 132 |  | 200 | 26.7° C. |
| 58 | 26 | 60 | 117 |  | 199 | 26.7° C. |
| 59 | 24 | 53 | 102 |  | 198 | 26.6° C. |
| 60 | 21 | 46 | 86 |  | 197 | 26.5° C. |
| 61 | 19 | 38 | 71 |  | 196 | 26.5° C. |
| 62 | 17 | 31 | 56 |  | 195 | 26.4° C. |
| 63 | 15 | 24 | 41 |  | 194 | 26.4° C. |
| 64 | 12 | 17 | 25 |  | 193 | 26.3° C. |
| 65 | 10 | 10 | 10 |  | 192 | 26.3° C. |
| 66 | 11 | 11 | 11 |  | 191 | 26.2° C. |
| 67 | 12 | 12 | 12 |  | 190 | 26.1° C. |
| 68 | 13 | 13 | 13 |  | 189 | 26.1° C. |
| 69 | 14 | 14 | 14 |  | 188 | 26.0° C. |
| 70 | 16 | 16 | 16 |  | 187 | 26.0° C. |
| 71 | 17 | 17 | 17 |  | 186 | 25.9° C. |
| 72 | 18 | 18 | 18 |  | 185 | 25.8° C. |
| 73 | 19 | 19 | 19 |  | 184 | 25.8° C. |
| 74 | 20 | 20 | 20 |  | 183 | 25.7° C. |
| 75 | 21 | 21 | 21 |  | 182 | 25.7° C. |
| 76 | 22 | 22 | 22 |  | 181 | 25.6° C. |
| 77 | 23 | 23 | 23 |  | 180 | 25.5° C. |
| 78 | 25 | 25 | 25 |  | 179 | 25.5° C. |
| 79 | 26 | 26 | 26 |  | 178 | 25.4° C. |
| 80 | 27 | 27 | 27 |  | 177 | 25.4° C. |
| 81 | 28 | 28 | 28 |  | 176 | 25.3° C. |
| 82 | 29 | 29 | 29 | Light Blue | 175 | 25.3° C. |
| 83 | 30 | 30 | 30 |  | 174 | 25.2° C. |
| 84 | 31 | 31 | 31 |  | 173 | 25.1° C. |
| 85 | 32 | 32 | 32 |  | 172 | 25.1° C. |
| 86 | 34 | 34 | 34 |  | 171 | 25.0° C. |
| 87 | 35 | 35 | 35 |  | 170 | 25.0° C. |
| 88 | 36 | 36 | 36 |  | 169 | 24.9° C. |
| 89 | 37 | 37 | 37 |  | 168 | 24.8° C. |
| 90 | 38 | 38 | 38 |  | 167 | 24.8° C. |
| 91 | 39 | 39 | 39 |  | 166 | 24.7° C. |
| 92 | 40 | 40 | 40 |  | 165 | 24.7° C. |
| 93 | 41 | 41 | 41 |  | 164 | 24.6° C. |
| 94 | 42 | 42 | 42 |  | 163 | 24.6° C. |
| 95 | 44 | 44 | 44 |  | 162 | 24.5° C. |
| 96 | 45 | 45 | 45 |  | 161 | 24.4° C. |
| 97 | 46 | 46 | 46 |  | 160 | 24.4° C. |
| 98 | 47 | 47 | 47 |  | 159 | 24.3° C. |
| 99 | 48 | 48 | 48 |  | 158 | 24.3° C. |
| 100 | 49 | 49 | 49 |  | 157 | 24.2° C. |
| 101 | 50 | 50 | 50 |  | 156 | 24.1° C. |
| 102 | 51 | 51 | 51 |  | 155 | 24.1° C. |
| 103 | 53 | 53 | 53 |  | 154 | 24.0° C. |
| 104 | 54 | 54 | 54 |  | 153 | 24.0° C. |
| 105 | 55 | 55 | 55 |  | 152 | 23.9° C. |
| 106 | 56 | 56 | 56 |  | 151 | 23.8° C. |
| 107 | 57 | 57 | 57 |  | 150 | 23.8° C. |
| 108 | 58 | 58 | 58 |  | 149 | 23.7° C. |
| 109 | 59 | 59 | 59 |  | 148 | 23.7° C. |
| 110 | 60 | 60 | 60 |  | 147 | 23.6° C. |
| 111 | 62 | 62 | 62 |  | 146 | 23.6° C. |
| 112 | 63 | 63 | 63 |  | 145 | 23.5° C. |
| 113 | 64 | 64 | 64 |  | 144 | 23.4° C. |
| 114 | 65 | 65 | 65 |  | 143 | 23.4° C. |
| 115 | 66 | 66 | 66 |  | 142 | 23.3° C. |
| 116 | 67 | 67 | 67 |  | 141 | 23.3° C. |
| 117 | 68 | 68 | 68 |  | 140 | 23.2° C. |
| 118 | 69 | 69 | 69 |  | 139 | 23.1° C. |
| 119 | 70 | 70 | 70 |  | 138 | 23.1° C. |
| 120 | 72 | 72 | 72 |  | 137 | 23.0° C. |
| 121 | 73 | 73 | 73 |  | 136 | 23.0° C. |
| 122 | 74 | 74 | 74 |  | 135 | 22.9° C. |
| 123 | 75 | 75 | 75 |  | 134 | 22.9° C. |
| 124 | 76 | 76 | 76 |  | 133 | 22.8° C. |
| 125 | 77 | 77 | 77 |  | 132 | 22.7° C. |
| 126 | 78 | 78 | 78 |  | 131 | 22.7° C. |
| 127 | 79 | 79 | 79 |  | 130 | 22.6° C. |
| 128 | 81 | 81 | 81 |  | 129 | 22.6° C. |
| 129 | 82 | 82 | 82 |  | 128 | 22.5° C. |
| 130 | 83 | 83 | 83 |  | 127 | 22.4° C. |
| 131 | 84 | 84 | 84 |  | 126 | 22.4° C. |
| 132 | 85 | 85 | 85 |  | 125 | 22.3° C. |
| 133 | 86 | 86 | 86 |  | 124 | 22.3° C. |
| 134 | 87 | 87 | 87 |  | 123 | 22.2° C. |
| 135 | 88 | 88 | 88 |  | 122 | 22.1° C. |
| 136 | 90 | 90 | 90 |  | 121 | 22.1° C. |
| 137 | 91 | 91 | 91 |  | 120 | 22.0° C. |
| 138 | 92 | 92 | 92 |  | 119 | 22.0° C. |
| 139 | 93 | 93 | 93 |  | 118 | 21.9° C. |
| 140 | 94 | 94 | 94 |  | 117 | 21.9° C. |
| 141 | 95 | 95 | 95 |  | 116 | 21.8° C. |
| 142 | 96 | 96 | 96 |  | 115 | 21.7° C. |
| 143 | 97 | 97 | 97 |  | 114 | 21.7° C. |
| 144 | 98 | 98 | 98 |  | 113 | 21.6° C. |
| 145 | 100 | 100 | 100 |  | 112 | 21.6° C. |
| 146 | 101 | 101 | 101 |  | 111 | 21.5° C. |
| 147 | 102 | 102 | 102 |  | 110 | 21.4° C. |
| 148 | 103 | 103 | 103 |  | 109 | 21.4° C. |
| 149 | 104 | 104 | 104 |  | 108 | 21.3° C. |
| 150 | 105 | 105 | 105 |  | 107 | 21.3° C. |
| 151 | 106 | 106 | 106 |  | 106 | 21.2° C. |
| 152 | 107 | 107 | 107 |  | 105 | 21.2° C. |
| 153 | 109 | 109 | 109 |  | 104 | 21.1° C. |
| 154 | 110 | 110 | 110 |  | 103 | 21.0° C. |
| 155 | 111 | 111 | 111 |  | 102 | 21.0° C. |
| 156 | 112 | 112 | 112 |  | 101 | 20.9° C. |
| 157 | 113 | 113 | 113 |  | 100 | 20.9° C. |
| 158 | 114 | 114 | 114 |  | 99 | 20.8° C. |
| 159 | 115 | 115 | 115 |  | 98 | 20.7° C. |
| 160 | 116 | 116 | 116 |  | 97 | 20.7° C. |
| 161 | 118 | 118 | 118 |  | 96 | 20.6° C. |
| 162 | 119 | 119 | 119 |  | 95 | 20.6° C. |
| 163 | 120 | 120 | 120 |  | 94 | 20.5° C. |
| 164 | 121 | 121 | 121 |  | 93 | 20.4° C. |
| 165 | 122 | 122 | 122 |  | 92 | 20.4° C. |
| 166 | 123 | 123 | 123 |  | 91 | 20.3° C. |
| 167 | 124 | 124 | 124 |  | 90 | 20.3° C. |
| 168 | 125 | 125 | 125 |  | 89 | 20.2° C. |
| 169 | 126 | 126 | 126 |  | 88 | 20.2° C. |
| 170 | 128 | 128 | 128 |  | 87 | 20.1° C. |
| 171 | 129 | 129 | 129 |  | 86 | 20.0° C. |
| 172 | 130 | 130 | 130 |  | 85 | 20.0° C. |
| 173 | 131 | 131 | 131 |  | 84 | 19.9° C. |
| 174 | 132 | 132 | 132 |  | 83 | 19.9° C. |
| 175 | 133 | 133 | 133 |  | 82 | 19.8° C. |
| 176 | 134 | 134 | 134 |  | 81 | 19.7° C. |
| 177 | 135 | 135 | 135 |  | 80 | 19.7° C. |
| 178 | 137 | 137 | 137 |  | 79 | 19.6° C. |
| 179 | 138 | 138 | 138 |  | 78 | 19.6° C. |
| 180 | 139 | 139 | 139 |  | 77 | 19.5° C. |
| 181 | 140 | 140 | 140 |  | 76 | 19.5° C. |
| 182 | 141 | 141 | 141 |  | 75 | 19.4° C. |
| 183 | 142 | 142 | 142 |  | 74 | 19.3° C. |
| 184 | 143 | 143 | 143 |  | 73 | 19.3° C. |
| 185 | 144 | 144 | 144 |  | 72 | 19.2° C. |
| 186 | 146 | 146 | 146 |  | 71 | 19.2° C. |
| 187 | 147 | 147 | 147 |  | 70 | 19.1° C. |
| 188 | 148 | 148 | 148 |  | 69 | 19.0° C. |
| 189 | 149 | 149 | 149 |  | 68 | 19.0° C. |
| 190 | 150 | 150 | 150 |  | 67 | 18.9° C. |
| 191 | 151 | 151 | 151 |  | 66 | 18.9° C. |
| 192 | 152 | 152 | 152 |  | 65 | 18.8° C. |
| 193 | 153 | 153 | 153 |  | 64 | 18.8° C. |
| 194 | 154 | 154 | 154 |  | 63 | 18.7° C. |
| 195 | 156 | 156 | 156 |  | 62 | 18.6° C. |
| 196 | 157 | 157 | 157 |  | 61 | 18.6° C. |
| 197 | 158 | 158 | 158 |  | 60 | 18.5° C. |
| 198 | 159 | 159 | 159 |  | 59 | 18.5° C. |
| 199 | 160 | 160 | 160 |  | 58 | 18.4° C. |
| 200 | 161 | 161 | 161 |  | 57 | 18.3° C. |
| 201 | 162 | 162 | 162 |  | 56 | 18.3° C. |
| 202 | 163 | 163 | 163 |  | 55 | 18.2° C. |
| 203 | 165 | 165 | 165 |  | 54 | 18.2° C. |
| 204 | 166 | 166 | 166 |  | 53 | 18.1° C. |
| 205 | 167 | 167 | 167 |  | 52 | 18.0° C. |
| 206 | 168 | 168 | 168 |  | 51 | 18.0° C. |

TABLE 6-continued

RGB Values of Colors and Grayscale Tones Shown in FIG. 17

| LINE UP | R | G | B | COLOR | LINE DOWN | TEMP |
|---|---|---|---|---|---|---|
| 207 | 169 | 169 | 169 | | 50 | 17.9° C. |
| 208 | 170 | 170 | 170 | | 49 | 17.9° C. |
| 209 | 171 | 171 | 171 | | 48 | 17.8° C. |
| 210 | 172 | 172 | 172 | | 47 | 17.8° C. |
| 211 | 174 | 174 | 174 | | 46 | 17.7° C. |
| 212 | 175 | 175 | 175 | | 45 | 17.6° C. |
| 213 | 176 | 176 | 176 | | 44 | 17.6° C. |
| 214 | 177 | 177 | 177 | | 43 | 17.5° C. |
| 215 | 178 | 178 | 178 | | 42 | 17.5° C. |
| 216 | 179 | 179 | 179 | | 41 | 17.4° C. |
| 217 | 180 | 180 | 180 | | 40 | 17.3° C. |
| 218 | 181 | 181 | 181 | | 39 | 17.3° C. |
| 219 | 182 | 182 | 182 | | 38 | 17.2° C. |
| 220 | 184 | 184 | 184 | | 37 | 17.2° C. |
| 221 | 185 | 185 | 185 | | 36 | 17.1° C. |
| 222 | 186 | 186 | 186 | | 35 | 17.1° C. |
| 223 | 187 | 187 | 187 | | 34 | 17.0° C. |
| 224 | 188 | 188 | 188 | | 33 | 16.9° C. |
| 225 | 189 | 189 | 189 | | 32 | 16.9° C. |
| 226 | 190 | 190 | 190 | | 31 | 16.8° C. |
| 227 | 191 | 191 | 191 | | 30 | 16.8° C. |
| 228 | 193 | 193 | 193 | | 29 | 16.7° C. |
| 229 | 194 | 194 | 194 | | 28 | 16.6° C. |
| 230 | 195 | 195 | 195 | | 27 | 16.6° C. |
| 231 | 196 | 196 | 196 | | 26 | 16.5° C. |
| 232 | 197 | 197 | 197 | | 25 | 16.5° C. |
| 233 | 198 | 198 | 198 | | 24 | 16.4° C. |
| 234 | 199 | 199 | 199 | | 23 | 16.3° C. |
| 235 | 200 | 200 | 200 | | 22 | 16.3° C. |
| 236 | 202 | 202 | 202 | | 21 | 16.2° C. |
| 237 | 203 | 203 | 203 | | 20 | 16.2° C. |
| 238 | 204 | 204 | 204 | | 19 | 16.1° C. |
| 239 | 205 | 205 | 205 | | 18 | 16.1° C. |
| 240 | 206 | 206 | 206 | | 17 | 16.0° C. |
| 241 | 207 | 207 | 207 | | 16 | 15.9° C. |
| 242 | 208 | 208 | 208 | | 15 | 15.9° C. |
| 243 | 209 | 209 | 209 | | 14 | 15.8° C. |
| 244 | 210 | 210 | 210 | | 13 | 15.8° C. |
| 245 | 212 | 212 | 212 | | 12 | 15.7° C. |
| 246 | 213 | 213 | 213 | | 11 | 15.6° C. |
| 247 | 214 | 214 | 214 | | 10 | 15.6° C. |
| 248 | 215 | 215 | 215 | | 9 | 15.5° C. |
| 249 | 216 | 216 | 216 | | 8 | 15.5° C. |
| 250 | 217 | 217 | 217 | | 7 | 15.4° C. |
| 251 | 218 | 218 | 218 | | 6 | 15.4° C. |
| 252 | 219 | 219 | 219 | | 5 | 15.3° C. |
| 253 | 221 | 221 | 221 | | 4 | 15.2° C. |
| 254 | 221 | 221 | 221 | | 3 | 15.2° C. |
| 255 | 221 | 221 | 221 | | 2 | 15.1° C. |
| 256 | 221 | 221 | 221 | Light Gray | 1 | 15.1° C. |

Figure 19:
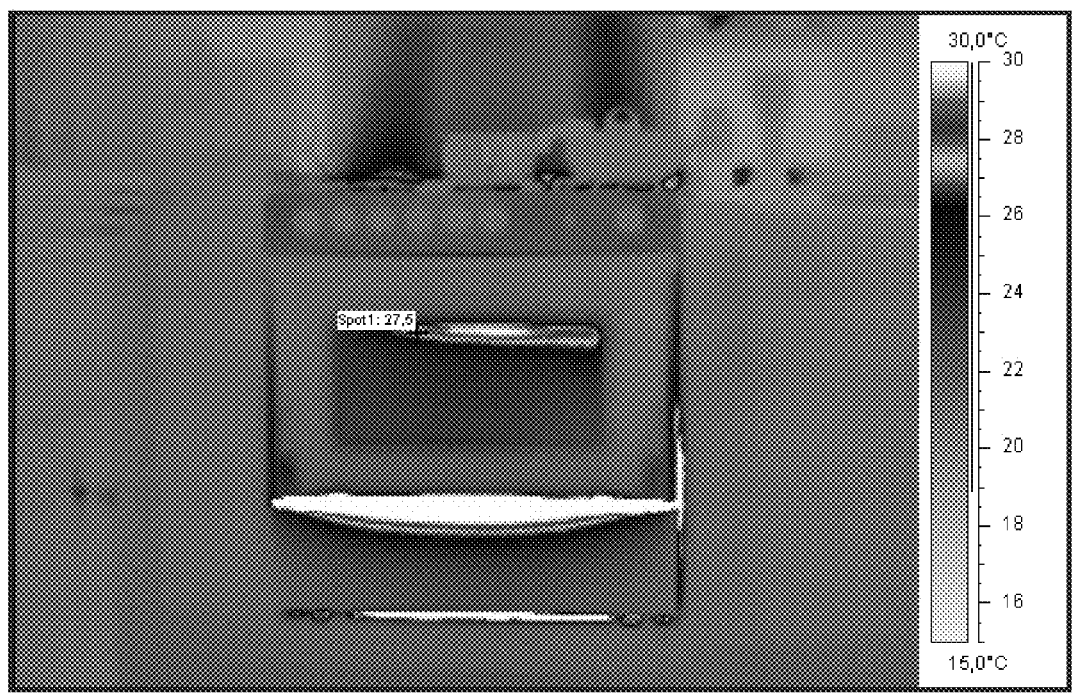
FIG. 19 shows an exemplary hot spot at 27.5° C.
Figure 20:
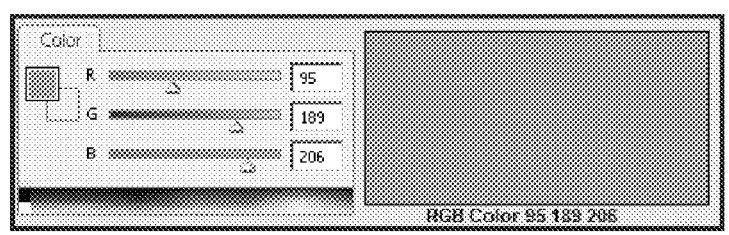
FIG. 20 shows the color RGB 95 189 206.
Figure 21:
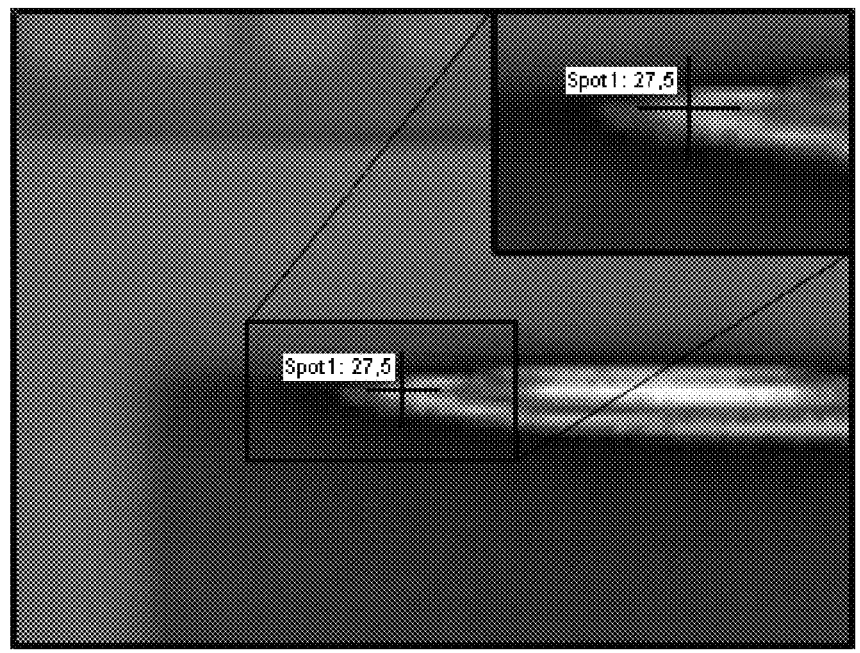
FIG. 21 shows a zoomed in area of the oven hot spot in FIG. 19.

Another example can be seen in the middle of FIG. 19. Taking for instance the hot spot marked in this figure, it reads 27.5° C. The pixel number of this hot spot is X=140 and Y=113.

Referring to the part of the complete Table 8 that has this line and column, we find the same value that is marked in the FIG. 19. As written above, every tone line corresponds to 0.0586 degrees per tone and from 15° to 27.5° C. there are 12.5 ° C. Dividing this 12.5 by 0.0586 we get 213 lines. Counting the lines from the bottom temperature in Table 6, we get the 95 189 206 RGB code, which is the color presented at the FIG. 20. This is the same color presented at the exact hot spot localization, as we can see in the FIG. 19 and in the zoomed image at FIG. 21.

Example 4

Figure 22:
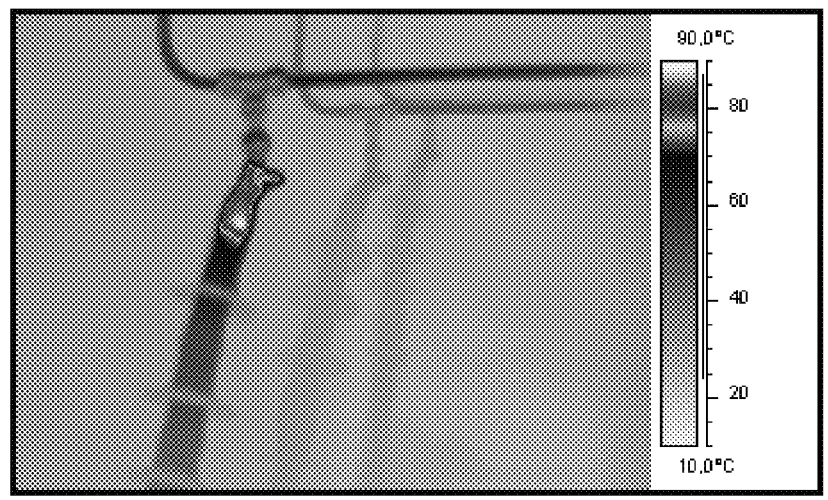
FIG. 22 shows a thermal image of a high tension terminal with the actual invention colors with inverted black and white tones applied.

Step-by-step Procedure for Converting a Thermal Image Using Inverted Black and White Plus Color Mixing Process on FIG. 22

In this example, the same method is applied to another thermal image. This example uses the same "High Tension Terminal" thermal image shown in the lower left-hand corner in FIG. 9 that can be seen with its temperatures side scale in FIG. 22. The inverted black and white with color scheme applied to this image is the same one applied to FIG. 17 and presented with its RGB codes in Table 7.

TABLE 7

RGB Values of Colors and Grayscale Tones Shown in FIG. 22

| LINE UP | R | G | B | COLOR | LINE DOWN | TEMP |
|---|---|---|---|---|---|---|
| 1 | 248 | 248 | 248 | Almost White | 256 | 89.0° C. |
| 2 | 248 | 248 | 248 | | 255 | 88.7° C. |
| 3 | 246 | 246 | 214 | | 254 | 88.4° C. |
| 4 | 245 | 244 | 179 | | 253 | 88.1° C. |
| 5 | 243 | 241 | 145 | | 252 | 87.8° C. |
| 6 | 242 | 239 | 110 | | 251 | 87.4° C. |
| 7 | 240 | 237 | 76 | Yellow | 250 | 87.1° C. |
| 8 | 238 | 235 | 42 | | 249 | 86.8° C. |
| 9 | 239 | 218 | 72 | | 248 | 86.5° C. |
| 10 | 237 | 199 | 68 | | 247 | 86.2° C. |
| 11 | 236 | 181 | 64 | | 246 | 85.9° C. |
| 12 | 235 | 162 | 60 | | 245 | 85.6° C. |
| 13 | 233 | 143 | 56 | | 244 | 85.3° C. |
| 14 | 232 | 124 | 53 | | 243 | 84.9° C. |
| 15 | 231 | 105 | 49 | | 242 | 84.6° C. |
| 16 | 230 | 87 | 45 | | 241 | 84.3° C. |
| 17 | 228 | 68 | 41 | | 240 | 84.0° C. |
| 18 | 227 | 49 | 37 | Almost Red | 239 | 83.7° C. |
| 19 | 214 | 50 | 36 | | 238 | 83.4° C. |
| 20 | 201 | 50 | 34 | | 237 | 83.1° C. |
| 21 | 188 | 51 | 33 | | 236 | 82.8° C. |
| 22 | 175 | 52 | 32 | | 235 | 82.4° C. |
| 23 | 161 | 53 | 30 | | 234 | 82.1° C. |
| 24 | 148 | 53 | 29 | | 233 | 81.8° C. |
| 25 | 135 | 54 | 27 | | 232 | 81.5° C. |
| 26 | 122 | 55 | 26 | | 231 | 81.2° C. |
| 27 | 109 | 55 | 25 | Orange | 230 | 80.9° C. |
| 28 | 96 | 56 | 23 | | 229 | 80.6° C. |
| 29 | 83 | 57 | 22 | | 228 | 80.3° C. |
| 30 | 70 | 58 | 21 | | 227 | 79.9° C. |
| 31 | 56 | 69 | 32 | | 226 | 79.6° C. |
| 32 | 50 | 79 | 44 | | 225 | 79.3° C. |
| 33 | 43 | 90 | 55 | | 224 | 79.0° C. |
| 34 | 37 | 100 | 67 | | 223 | 78.7° C. |
| 35 | 30 | 111 | 79 | | 222 | 78.4° C. |
| 36 | 37 | 120 | 93 | | 221 | 78.1° C. |
| 37 | 44 | 128 | 107 | | 220 | 77.8° C. |
| 38 | 52 | 137 | 121 | | 219 | 77.4° C. |
| 39 | 59 | 146 | 135 | | 218 | 77.1° C. |
| 40 | 66 | 154 | 149 | | 217 | 76.8° C. |
| 41 | 73 | 163 | 164 | | 216 | 76.5° C. |
| 42 | 80 | 172 | 178 | | 215 | 76.2° C. |
| 43 | 88 | 181 | 192 | | 214 | 75.9° C. |
| 44 | 95 | 189 | 206 | | 213 | 75.6° C. |
| 45 | 102 | 198 | 220 | | 212 | 75.3° C. |
| 46 | 95 | 186 | 214 | | 211 | 74.9° C. |
| 47 | 88 | 175 | 209 | | 210 | 74.6° C. |
| 48 | 81 | 163 | 203 | | 209 | 74.3° C. |
| 49 | 74 | 151 | 197 | | 208 | 74.0° C. |
| 50 | 67 | 140 | 192 | | 207 | 73.7° C. |
| 51 | 61 | 128 | 186 | | 206 | 73.4° C. |
| 52 | 54 | 116 | 180 | | 205 | 73.1° C. |
| 53 | 47 | 104 | 174 | | 204 | 72.8° C. |
| 54 | 40 | 93 | 169 | | 203 | 72.4° C. |
| 55 | 33 | 81 | 163 | | 202 | 72.1° C. |
| 56 | 31 | 74 | 148 | | 201 | 71.8° C. |

TABLE 7-continued

RGB Values of Colors and Grayscale Tones Shown in FIG. 22

| LINE UP | R | G | B | COLOR | LINE DOWN | TEMP |
|---|---|---|---|---|---|---|
| 57 | 28 | 67 | 132 | | 200 | 71.5° C. |
| 58 | 26 | 60 | 117 | | 199 | 71.2° C. |
| 59 | 24 | 53 | 102 | | 198 | 70.9° C. |
| 60 | 21 | 46 | 86 | | 197 | 70.6° C. |
| 61 | 19 | 38 | 71 | | 196 | 70.3° C. |
| 62 | 17 | 31 | 56 | | 195 | 69.9° C. |
| 63 | 15 | 24 | 41 | | 194 | 69.6° C. |
| 64 | 12 | 17 | 25 | | 193 | 69.3° C. |
| 65 | 10 | 10 | 10 | | 192 | 69.0° C. |
| 66 | 11 | 11 | 11 | | 191 | 68.7° C. |
| 67 | 12 | 12 | 12 | | 190 | 68.4° C. |
| 68 | 13 | 13 | 13 | | 189 | 68.1° C. |
| 69 | 14 | 14 | 14 | | 188 | 67.8° C. |
| 70 | 16 | 16 | 16 | | 187 | 67.4° C. |
| 71 | 17 | 17 | 17 | | 186 | 67.1° C. |
| 72 | 18 | 18 | 18 | | 185 | 66.8° C. |
| 73 | 19 | 19 | 19 | | 184 | 66.5° C. |
| 74 | 20 | 20 | 20 | | 183 | 66.2° C. |
| 75 | 21 | 21 | 21 | | 182 | 65.9° C. |
| 76 | 22 | 22 | 22 | | 181 | 65.6° C. |
| 77 | 23 | 23 | 23 | | 180 | 65.3° C. |
| 78 | 25 | 25 | 25 | | 179 | 64.9° C. |
| 79 | 26 | 26 | 26 | | 178 | 64.6° C. |
| 80 | 27 | 27 | 27 | | 177 | 64.3° C. |
| 81 | 28 | 28 | 28 | | 176 | 64.0° C. |
| 82 | 29 | 29 | 29 | Light Blue | 175 | 63.7° C. |
| 83 | 30 | 30 | 30 | | 174 | 63.4° C. |
| 84 | 31 | 31 | 31 | | 173 | 63.1° C. |
| 85 | 32 | 32 | 32 | | 172 | 62.8° C. |
| 86 | 34 | 34 | 34 | | 171 | 62.4° C. |
| 87 | 35 | 35 | 35 | | 170 | 62.1° C. |
| 88 | 36 | 36 | 36 | | 169 | 61.8° C. |
| 89 | 37 | 37 | 37 | | 168 | 61.5° C. |
| 90 | 38 | 38 | 38 | | 167 | 61.2° C. |
| 91 | 39 | 39 | 39 | | 166 | 60.9° C. |
| 92 | 40 | 40 | 40 | | 165 | 60.6° C. |
| 93 | 41 | 41 | 41 | | 164 | 60.3° C. |
| 94 | 42 | 42 | 42 | | 163 | 59.9° C. |
| 95 | 44 | 44 | 44 | | 162 | 59.6° C. |
| 96 | 45 | 45 | 45 | | 161 | 59.3° C. |
| 97 | 46 | 46 | 46 | | 160 | 59.0° C. |
| 98 | 47 | 47 | 47 | | 159 | 58.7° C. |
| 99 | 48 | 48 | 48 | | 158 | 58.4° C. |
| 100 | 49 | 49 | 49 | | 157 | 58.1° C. |
| 101 | 50 | 50 | 50 | | 156 | 57.8° C. |
| 102 | 51 | 51 | 51 | | 155 | 57.4° C. |
| 103 | 53 | 53 | 53 | | 154 | 57.1° C. |
| 104 | 54 | 54 | 54 | | 153 | 56.8° C. |
| 105 | 55 | 55 | 55 | | 152 | 56.5° C. |
| 106 | 56 | 56 | 56 | | 151 | 56.2° C. |
| 107 | 57 | 57 | 57 | | 150 | 55.9° C. |
| 108 | 58 | 58 | 58 | | 149 | 55.6° C. |
| 109 | 59 | 59 | 59 | | 148 | 55.3° C. |
| 110 | 60 | 60 | 60 | | 147 | 54.9° C. |
| 111 | 62 | 62 | 62 | | 146 | 54.6° C. |
| 112 | 63 | 63 | 63 | | 145 | 54.3° C. |
| 113 | 64 | 64 | 64 | | 144 | 54.0° C. |
| 114 | 65 | 65 | 65 | | 143 | 53.7° C. |
| 115 | 66 | 66 | 66 | | 142 | 53.4° C. |
| 116 | 67 | 67 | 67 | | 141 | 53.1° C. |
| 117 | 68 | 68 | 68 | | 140 | 52.8° C. |
| 118 | 69 | 69 | 69 | | 139 | 52.4° C. |
| 119 | 70 | 70 | 70 | | 138 | 52.1° C. |
| 120 | 72 | 72 | 72 | | 137 | 51.8° C. |
| 121 | 73 | 73 | 73 | | 136 | 51.5° C. |
| 122 | 74 | 74 | 74 | | 135 | 51.2° C. |
| 123 | 75 | 75 | 75 | | 134 | 50.9° C. |
| 124 | 76 | 76 | 76 | | 133 | 50.6° C. |
| 125 | 77 | 77 | 77 | | 132 | 50.3° C. |
| 126 | 78 | 78 | 78 | | 131 | 49.9° C. |
| 127 | 79 | 79 | 79 | | 130 | 49.6° C. |
| 128 | 81 | 81 | 81 | | 129 | 49.3° C. |
| 129 | 82 | 82 | 82 | | 128 | 49.0° C. |
| 130 | 83 | 83 | 83 | | 127 | 48.7° C. |
| 131 | 84 | 84 | 84 | | 126 | 48.4° C. |
| 132 | 85 | 85 | 85 | | 125 | 48.1° C. |
| 133 | 86 | 86 | 86 | | 124 | 47.8° C. |
| 134 | 87 | 87 | 87 | | 123 | 47.4° C. |
| 135 | 88 | 88 | 88 | | 122 | 47.1° C. |
| 136 | 90 | 90 | 90 | | 121 | 46.8° C. |
| 137 | 91 | 91 | 91 | | 120 | 46.5° C. |
| 138 | 92 | 92 | 92 | | 119 | 46.2° C. |
| 139 | 93 | 93 | 93 | | 118 | 45.9° C. |
| 140 | 94 | 94 | 94 | | 117 | 45.6° C. |
| 141 | 95 | 95 | 95 | | 116 | 45.3° C. |
| 142 | 96 | 96 | 96 | | 115 | 44.9° C. |
| 143 | 97 | 97 | 97 | | 114 | 44.6° C. |
| 144 | 98 | 98 | 98 | | 113 | 44.3° C. |
| 145 | 100 | 100 | 100 | | 112 | 44.0° C. |
| 146 | 101 | 101 | 101 | | 111 | 43.7° C. |
| 147 | 102 | 102 | 102 | | 110 | 43.4° C. |
| 148 | 103 | 103 | 103 | | 109 | 43.1° C. |
| 149 | 104 | 104 | 104 | | 108 | 42.8° C. |
| 150 | 105 | 105 | 105 | | 107 | 42.4° C. |
| 151 | 106 | 106 | 106 | | 106 | 42.1° C. |
| 152 | 107 | 107 | 107 | | 105 | 41.8° C. |
| 153 | 109 | 109 | 109 | | 104 | 41.5° C. |
| 154 | 110 | 110 | 110 | | 103 | 41.2° C. |
| 155 | 111 | 111 | 111 | | 102 | 40.9° C. |
| 156 | 112 | 112 | 112 | | 101 | 40.6° C. |
| 157 | 113 | 113 | 113 | | 100 | 40.3° C. |
| 158 | 114 | 114 | 114 | | 99 | 39.9° C. |
| 159 | 115 | 115 | 115 | | 98 | 39.6° C. |
| 160 | 116 | 116 | 116 | | 97 | 39.3° C. |
| 161 | 118 | 118 | 118 | | 96 | 39.0° C. |
| 162 | 119 | 119 | 119 | | 95 | 38.7° C. |
| 163 | 120 | 120 | 120 | | 94 | 38.4° C. |
| 164 | 121 | 121 | 121 | | 93 | 38.1° C. |
| 165 | 122 | 122 | 122 | | 92 | 37.8° C. |
| 166 | 123 | 123 | 123 | | 91 | 37.4° C. |
| 167 | 124 | 124 | 124 | | 90 | 37.1° C. |
| 168 | 125 | 125 | 125 | | 89 | 36.8° C. |
| 169 | 126 | 126 | 126 | | 88 | 36.5° C. |
| 170 | 128 | 128 | 128 | | 87 | 36.2° C. |
| 171 | 129 | 129 | 129 | | 86 | 35.9° C. |
| 172 | 130 | 130 | 130 | | 85 | 35.6° C. |
| 173 | 131 | 131 | 131 | | 84 | 35.3° C. |
| 174 | 132 | 132 | 132 | | 83 | 34.9° C. |
| 175 | 133 | 133 | 133 | | 82 | 34.6° C. |
| 176 | 134 | 134 | 134 | | 81 | 34.3° C. |
| 177 | 135 | 135 | 135 | | 80 | 34.0° C. |
| 178 | 137 | 137 | 137 | | 79 | 33.7° C. |
| 179 | 138 | 138 | 138 | | 78 | 33.4° C. |
| 180 | 139 | 139 | 139 | | 77 | 33.1° C. |
| 181 | 140 | 140 | 140 | | 76 | 32.8° C. |
| 182 | 141 | 141 | 141 | | 75 | 32.4° C. |
| 183 | 142 | 142 | 142 | | 74 | 32.1° C. |
| 184 | 143 | 143 | 143 | | 73 | 31.8° C. |
| 185 | 144 | 144 | 144 | | 72 | 31.5° C. |
| 186 | 146 | 146 | 146 | | 71 | 31.2° C. |
| 187 | 147 | 147 | 147 | | 70 | 30.9° C. |
| 188 | 148 | 148 | 148 | | 69 | 30.6° C. |
| 189 | 149 | 149 | 149 | | 68 | 30.3° C. |
| 190 | 150 | 150 | 150 | | 67 | 29.9° C. |
| 191 | 151 | 151 | 151 | | 66 | 29.6° C. |
| 192 | 152 | 152 | 152 | | 65 | 29.3° C. |
| 193 | 153 | 153 | 153 | | 64 | 29.0° C. |
| 194 | 154 | 154 | 154 | | 63 | 28.7° C. |
| 195 | 156 | 156 | 156 | | 62 | 28.4° C. |
| 196 | 157 | 157 | 157 | | 61 | 28.1° C. |
| 197 | 158 | 158 | 158 | | 60 | 27.8° C. |
| 198 | 159 | 159 | 159 | | 59 | 27.4° C. |
| 199 | 160 | 160 | 160 | | 58 | 27.1° C. |
| 200 | 161 | 161 | 161 | | 57 | 26.8° C. |
| 201 | 162 | 162 | 162 | | 56 | 26.5° C. |
| 202 | 163 | 163 | 163 | | 55 | 26.2° C. |
| 203 | 165 | 165 | 165 | | 54 | 25.9° C. |
| 204 | 166 | 166 | 166 | | 53 | 25.6° C. |
| 205 | 167 | 167 | 167 | | 52 | 25.3° C. |
| 206 | 168 | 168 | 168 | | 51 | 24.9° C. |

TABLE 7-continued

RGB Values of Colors and Grayscale Tones Shown in FIG. 22

| LINE UP | R | G | B | COLOR | LINE DOWN | TEMP |
|---|---|---|---|---|---|---|
| 207 | 169 | 169 | 169 | | 50 | 24.6° C. |
| 208 | 170 | 170 | 170 | | 49 | 24.3° C. |
| 209 | 171 | 171 | 171 | | 48 | 24.0° C. |
| 210 | 172 | 172 | 172 | | 47 | 23.7° C. |
| 211 | 174 | 174 | 174 | | 46 | 23.4° C. |
| 212 | 175 | 175 | 175 | | 45 | 23.1° C. |
| 213 | 176 | 176 | 176 | | 44 | 22.8° C. |
| 214 | 177 | 177 | 177 | | 43 | 22.4° C. |
| 215 | 178 | 178 | 178 | | 42 | 22.1° C. |
| 216 | 179 | 179 | 179 | | 41 | 21.8° C. |
| 217 | 180 | 180 | 180 | | 40 | 21.5° C. |
| 218 | 181 | 181 | 181 | | 39 | 21.2° C. |
| 219 | 182 | 182 | 182 | | 38 | 20.9° C. |
| 220 | 184 | 184 | 184 | | 37 | 20.6° C. |
| 221 | 185 | 185 | 185 | | 36 | 20.3° C. |
| 222 | 186 | 186 | 186 | | 35 | 19.9° C. |
| 223 | 187 | 187 | 187 | | 34 | 19.6° C. |
| 224 | 188 | 188 | 188 | | 33 | 19.3° C. |
| 225 | 189 | 189 | 189 | | 32 | 19.0° C. |
| 226 | 190 | 190 | 190 | | 31 | 18.7° C. |
| 227 | 191 | 191 | 191 | | 30 | 18.4° C. |
| 228 | 193 | 193 | 193 | | 29 | 18.1° C. |
| 229 | 194 | 194 | 194 | | 28 | 17.8° C. |
| 230 | 195 | 195 | 195 | | 27 | 17.4° C. |
| 231 | 196 | 196 | 196 | | 26 | 17.1° C. |
| 232 | 197 | 197 | 197 | | 25 | 16.8° C. |
| 233 | 198 | 198 | 198 | | 24 | 16.5° C. |
| 234 | 199 | 199 | 199 | | 23 | 16.2° C. |
| 235 | 200 | 200 | 200 | | 22 | 15.9° C. |
| 236 | 202 | 202 | 202 | | 21 | 15.6° C. |
| 237 | 203 | 203 | 203 | | 20 | 15.3° C. |
| 238 | 204 | 204 | 204 | | 19 | 14.9° C. |
| 239 | 205 | 205 | 205 | | 18 | 14.6° C. |
| 240 | 206 | 206 | 206 | | 17 | 14.3° C. |
| 241 | 207 | 207 | 207 | | 16 | 14.0° C. |
| 242 | 208 | 208 | 208 | | 15 | 13.7° C. |
| 243 | 209 | 209 | 209 | | 14 | 13.4° C. |
| 244 | 210 | 210 | 210 | | 13 | 13.1° C. |
| 245 | 212 | 212 | 212 | | 12 | 12.8° C. |
| 246 | 213 | 213 | 213 | | 11 | 12.4° C. |
| 247 | 214 | 214 | 214 | | 10 | 12.1° C. |
| 248 | 215 | 215 | 215 | | 9 | 11.8° C. |
| 249 | 216 | 216 | 216 | | 8 | 11.5° C. |
| 250 | 217 | 217 | 217 | | 7 | 11.2° C. |
| 251 | 218 | 218 | 218 | | 6 | 10.9° C. |
| 252 | 219 | 219 | 219 | | 5 | 10.6° C. |
| 253 | 221 | 221 | 221 | | 4 | 10.3° C. |
| 254 | 221 | 221 | 221 | | 3 | 9.9° C. |
| 255 | 221 | 221 | 221 | | 2 | 9.6° C. |
| 256 | 221 | 221 | 221 | Light Gray | 1 | 9.3° C. |

Figure 23A:
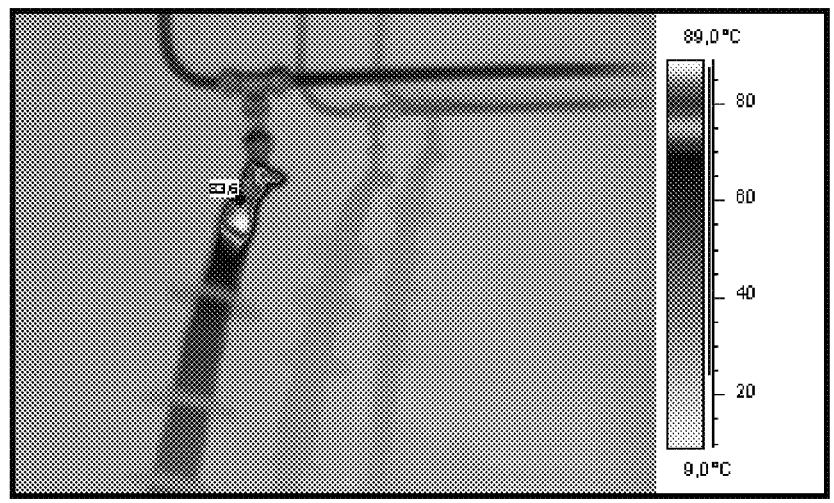
FIG. 23a shows a hotspot selected in FIG. 22 for the purpose of demonstrating how the coding calculations are done.
Figure 23B:
FIG. 23b shows a zoomed part of FIG. 22 to enhance the hotspot.
Figure 24:
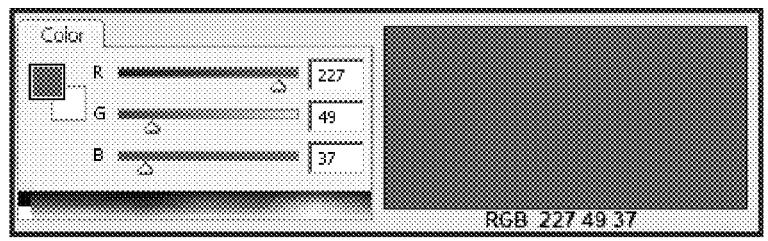
Figure 25:
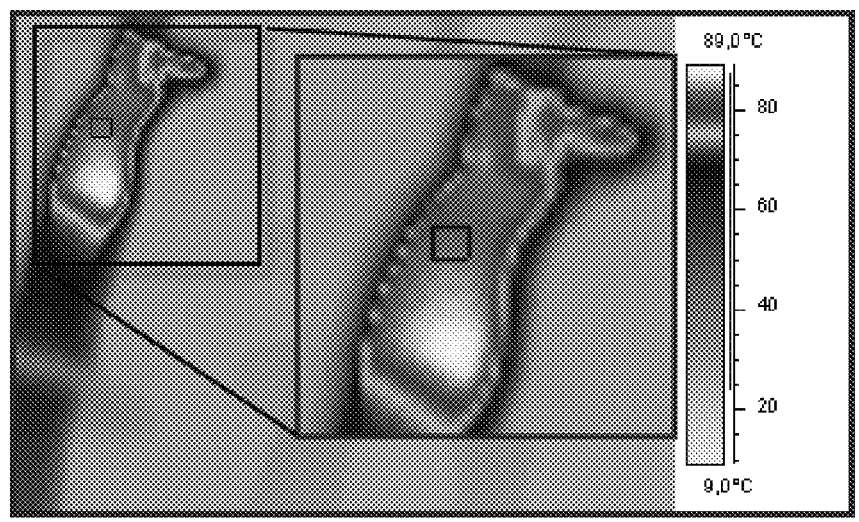
FIG. 25 shows a zoom of the hotspot area to demonstrate the color of FIG. 24.

A hot spot in this figure is chosen that represents an important temperature in the electrical terminal, now presented as FIG. 23a. The precise pixel position of this hot spot is line 93 and column 112 and its temperature value is 83.6° C. as can be seen at the zoomed FIG. 23b and in Table 9. The good quality chosen temperature span to this thermal image was 80° C., beginning at 9° C. as the lowest temperature, and finishing as 89° C. as the highest temperature. Using the same calculation as above in Example 2, we have 256 tones to cover 80° C. Dividing 80 by 256 we have 0.3125 ° C. for every tone. Subtracting the minimum image temperature of 9° C. from the hot spot temperature of 83.6° C. we arrive at 74.6° C. Dividing again the 74.6° C. by the 0.3125 degrees per tone, we obtain 239 lines above the lowest limit temperature that is 9° C. From Table 6, we find that counting from the last line to the top 239 lines we get the line 18 that has the following RGB code: 227 49 37 and has a color presented in FIG. 24. Note that 239 plus 18 is equal to 257 and the difference of 1 line is due to decimals roundings made for this demonstration purposes. Zooming on FIG. 23, we can see that this is exactly the same temperature shown inside the selected hotspot of FIG. 25.

Figure 26A:
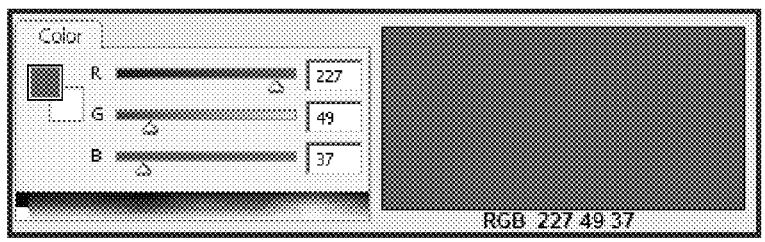
FIGS. 26a and 26b show the consecutive RGB color lines result from both calculations from the top and bottom reference temperatures.
Figure 26B:
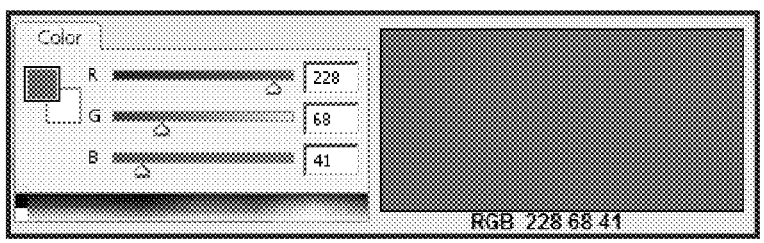

The same calculation is performed using the superior temperature limit. The chosen highest temperature is 89° C. The hotspot temperature is 83.6° C. Accordingly, there is a difference from the hotspot to the top temperature of 5.4° C. Since there are 0.3125 degrees per tone, 5.4° C. need to be divided by the 0.3125° C. per tone to have a total rounded up to 17 lines from top to bottom, beginning at the highest temperature. In Table 7 we find that the RGB color of line 17 has the RGB code of 228 68 41. This line is just 1 (one) line above the line calculated using the lower temperature limit due to rounding the decimals successively during calculations. Visually, the color is almost indistinguishable from line 18 as can be seen at FIG. 26 since the RGB codes are nearly identical.

Then when the inverted black and white colors are added, between the same upper and lower limits, the resultant thermal image becomes clearer, not tiring to view and easy understandable as can be seen in FIGS. 19, 22 and the remaining images in FIG. 12.

All mathematical operations are done by general electronic circuitry that is different from one thermal camera manufacturer to another. Despite of this, the visual video output that follows this color plus inverted black and white tones will always present a much better image discrimination and a high contrast definition which makes a large difference to the human eye and mind that has to view, understand and interpret thermal images for prolonged periods of time.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

What is claimed is:

1. A method for enhancing visualization of infrared images of imaged objects, the method comprising: dividing temperature data obtained from an infrared camera at least into a first set of temperature data and a second set of temperature data, wherein the first set of temperature data comprises temperatures selected to be visualized with color, and the second set of temperature data comprises temperatures not to be visualized with color but instead visualized in inverted black and white; converting the temperatures selected to be visualized with color into color tones; converting the temperatures not to be visualized with color into black and white tones; and mixing the color tones and the black and white tones into a single image; wherein:

said dividing temperature data obtained from an infrared camera at least into a first set of temperature data and a second set of temperature data comprises setting an upper temperature value and a lower temperature value for the first set of temperature data, assigning temperatures falling within the interval between the upper temperature value and the lower temperature value, inclusive of said values, to said first set of temperature data and assigning temperatures falling outside the interval between the upper temperature value and the lower temperature value to said second set of temperature data said converting the temperatures selected to be visualized with color into color tones comprises selecting a color palette and evenly distributing and associating RGB values of colors in said color palette to said temperatures selected to be visualized with color;

said converting the temperatures not to be visualized with color into black and white tones comprises selecting a black and white palette and evenly distributing and associating RGB values of tones in said black and white palette to said temperatures not to be visualized with color;

colors in said color palette are arbitrarily chosen and arranged based on artistic taste;

tones in said black and white palette are arbitrarily chosen and arranged based on artistic taste;

said color palette and said black and white palette are selected from those shown in FIG. 6.

2. A method for enhancing visualization of infrared images of imaged objects, the method comprising: dividing temperature data obtained from an infrared camera at least into a first set of temperature data and a second set of temperature data, wherein the first set of temperature data comprises temperatures selected to be visualized with color, and the second set of temperature data comprises temperatures not to be visualized with color but instead visualized in inverted black and white; converting the temperatures selected to be visualized with color into color tones; converting the temperatures not to be visualized with color into black and white tones; and mixing the color tones and the black and white tones into a single image; wherein:

said dividing temperature data obtained from an infrared camera at least into a first set of temperature data and a second set of temperature data comprises setting an upper temperature value and a lower temperature value for the first set of temperature data, assigning temperatures falling within the interval between the upper temperature value and the lower temperature value, inclusive of said values, to said first set of temperature data and assigning temperatures falling outside the interval between the upper temperature value and the lower temperature value to said second set of temperature data said converting the temperatures selected to be visualized with color into color tones comprises selecting a color palette and evenly distributing and associating RGB values of colors in said color palette to said temperatures selected to be visualized with color;

said converting the temperatures not to be visualized with color into black and white tones comprises selecting a black and white palette and evenly distributing and associating RGB values of tones in said black and white palette to said temperatures not to be visualized with color;

colors in said color palette are arbitrarily chosen and arranged based on artistic taste;

tones in said black and white palette are arbitrarily chosen and arranged based on artistic taste;

said color palette and said black and white palette are selected from those shown in Table 4.

3. A method for enhancing visualization of infrared images of imaged objects, the method comprising: dividing temperature data obtained from an infrared camera at least into a first set of temperature data and a second set of temperature data, wherein the first set of temperature data comprises temperatures selected to be visualized with color, and the second set of temperature data comprises temperatures not to be visualized with color but instead visualized in inverted black and white; converting the temperatures selected to be visualized with color into color tones; converting the temperatures not to be visualized with color into black and white tones; and mixing the color tones and the black and white tones into a single image; wherein:

said dividing temperature data obtained from an infrared camera at least into a first set of temperature data and a second set of temperature data comprises setting an upper temperature value and a lower temperature value for the first set of temperature data, assigning temperatures falling within the interval between the upper temperature value and the lower temperature value, inclusive of said values, to said first set of temperature data; and assigning temperatures falling outside the interval between the upper temperature value and the lower temperature value to said second set of temperature data;

said converting the temperatures selected to be visualized with color into color tones comprises selecting a color palette and evenly distributing and associating RGB values of colors in said color palette to said temperatures selected to be visualized with color;

said converting the temperatures not to be visualized with color into black and white tones comprises selecting a black and white palette and evenly distributing and associating RGB values of tones in said black and white palette to said temperatures not to be visualized with color;

said color palette and said black and white palette are selected from those shown in FIG. 6.

* * * * *